INVENTOR.
THOMAS L. WILSON

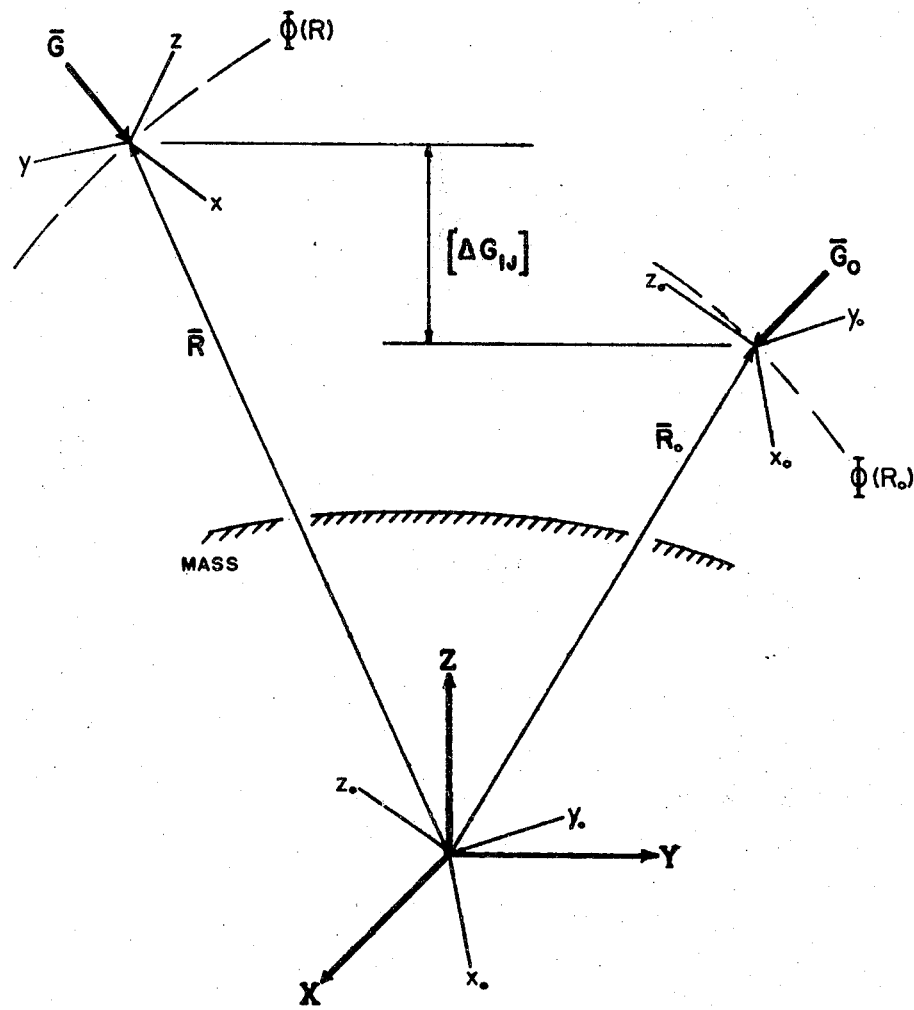
FIG. IA

INVENTOR.
THOMAS L. WILSON
BY
ATTORNEYS

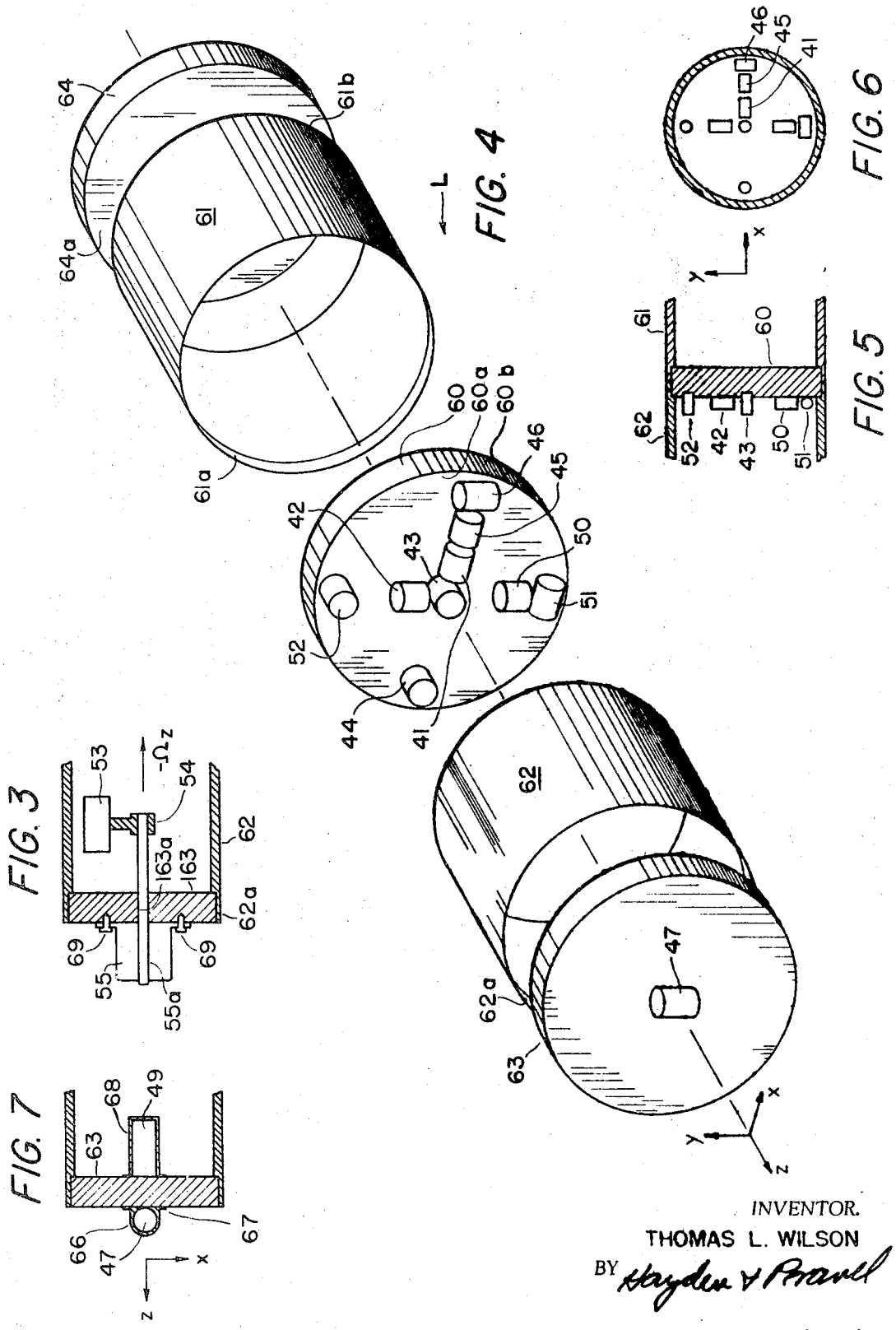

INVENTOR.
THOMAS L. WILSON

INVENTOR.
THOMAS L. WILSON

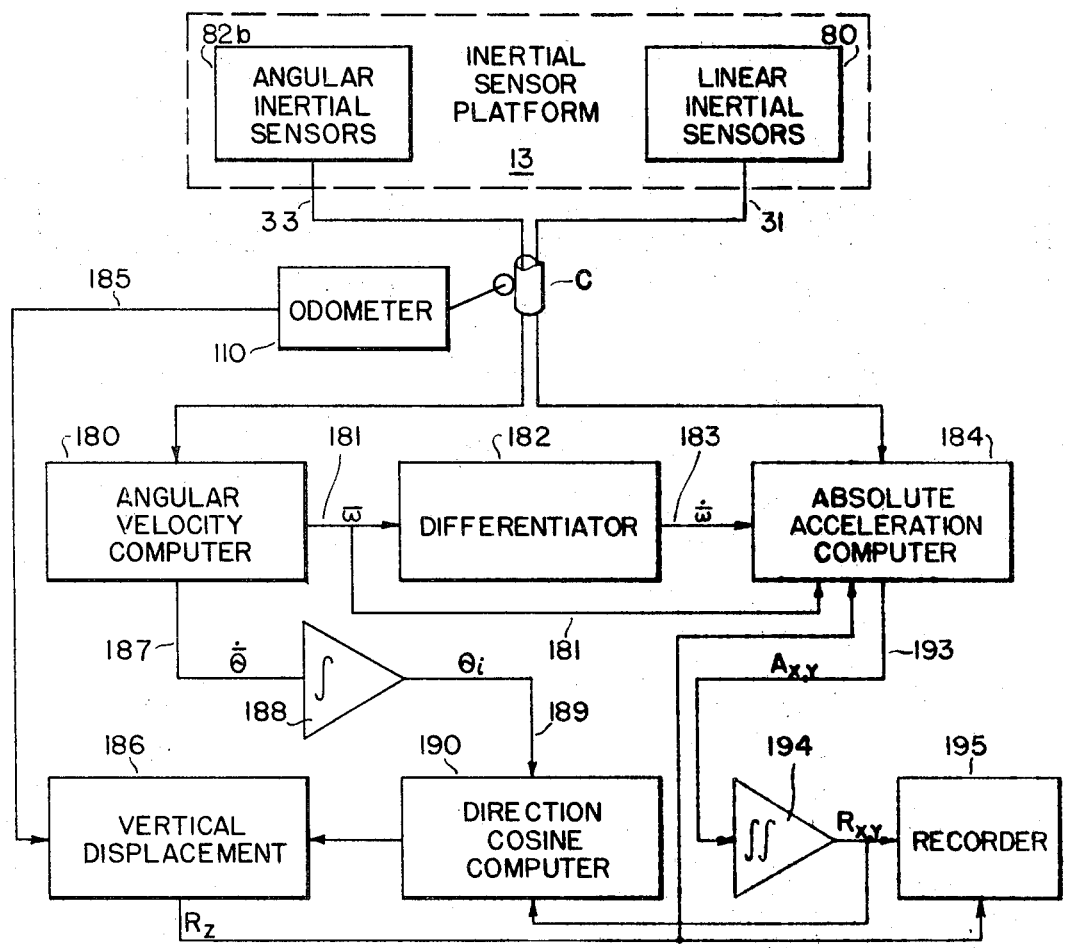
FIG. II

United States Patent Office 3,545,266
Patented Dec. 8, 1970

3,545,266
NONINERTIAL STRAPPING-DOWN GRAVITY GRADIENT NAVIGATION SYSTEM
Thomas L. Wilson, Hanszen College, Rice University, Houston, Tex. 77001
Filed Feb. 17, 1964, Ser. No. 345,384
Int. Cl. G01c 21/12, 23/00
U.S. Cl. 73—151
7 Claims

ABSTRACT OF THE DISCLOSURE

An acceleration sensor unit which is not inertial employing strapped-down differential or rotating inertial sensors in the presence of nonuniform gravitational field phenomena as well as employing means for separation of spatial variations in nonuniform acceleration effects to determine directly nonuniform gravitational acceleration. A navigation system for determining the equations of motion of a vehicle or other object in the presence of any acceleration phenomena, utilizing purely inertial sensing means to determine directly effects due to nonuniform gravitational acceleration. A well surveying and gravitational mapping device for indicating the course of a well wherein said navigation system is employed.

---

The present invention relates to navigation by self-contained means, with particular emphasis upon the determination of motion in the presence of unknown gravitational acceleration effects. As disclosed herein, the navigation system of this invention employs gravity gradient navigation techniques to determine gravitational acceleration, velocity, and distance in space, so as to measure directly nonuniform gravitational acceleration.

Conventional inertial sensors are employed to measure the translational and rotational acceleration phenomena due to nongravitational and uniform gravitational effects, as is done in the state of the art. However, differential inertial sensors or rotating inertial sensors are also employed in order to determine the nonuniform gravitational characteristics of the sensing unit in the presence of the above acceleration effects. Such nonuniform gravitational or spatial variations are then isolated and utilized to compensate the outputs or the state of the original conventional inertial sensing means. The output of the resultant sensing unit, therefore, actually measures not only the acceleration effects sensed by the so-called inertial sensor, but also the acceleration effects due to gravitational phenomena. For this reason, the sensing unit is described as noninertial.

Nonuniform gravitational acceleration is thus accounted for. By so determining gravitational acceleration with purely inertial means, the invention resolves the dilemma of the inertial sensor in gravitational coast or free fall. And because this is accomplished directly and empirically without a posterior potential function techniques, this disclosure constitutes a new art of noninertial naviation.

It is an object of this invention, then, to disclose an epistemologically consistent means for the determination and transformation of motion in space. In contrast to the state of the art, a self-contained means of measurement of three-dimensional acceleration, velocity, distance and attitude in the presence of any gravitational or nongravitational field phenomena is realized, using purely inertial sensors.

An inertial navigation system is concerned with maintaining a frame of reference in space in order to establish a basis for the equations of motion of a vehicle in terms of its position, velocity, acceleration, and attitude. Conventionally, this is accomplished by means of a gimballed platform which is stabilized so as to provide a physical definition of that frame of reference as well as to simplify the environment of the sensors in the system. Alternatively, the stabilized platform can be dispensed with, as presented in this disclosure, thus trading off a complex stable platform for a simpler realization of simulated inertial space, although at the price of subjecting the navigational sensors to a more complicated environment.

In any case, the crux of an inertial navigation system is its sensing means, the inertial sensor. But the conventional inertial sensor cannot account for nonuniform gravitational acceleration phenomena. An object of this disclosure is to demonstrate that the sensing unit of this invention can.

An inertial sensor, in its simplest form consists of an inertial mass within the sensor unit which is ideally isolated from the external inertial forces influencing the motion of the unit as a whole. As a consequence, the relative behavior of the inertial mass is a manifestation of the motion of the unit in space. Making certain assumptions about the nature of inertial forces, then, this behavior is used to describe the inertial or nongravitational accelerations present in the environment.

However, the single inertial sensor cannot describe gravitational acceleration effects due to nonuniform free fall. This dilemma arises because gravitational field phenomena create no relative motion of the inertial mass with respect to the sensor's center of mass, and consequently a purely inertial system in the state of the art is incapable of measuring directly the three-dimensional acceleration encountered by it in the real world.

A single inertial sensor would measure actual acceleration in the presence of an artifice known as a "uniform gravitational field," although the latter has no sound, physically established basis. (It is tautologically equivalent to an inertial acceleration, by definition, and consequently its notion can be considered synthetic and redundant to the art of navigation.) In a make-believe "uniform gravitational field," the sensor would really measure the difference between the uniform gravitational and inertial acceleration effects, being biased so as to indicate an acceleration equivalent to the uniform gravitational effect in the absence of nongravitational effects.

Rather than employ the concept of "uniform gravitational" effects, it is better to describe the state of the art in inertial navigation as having a sensing means which is capable of navigating in a world of constant gravitational potential.

The real world, on the contrary, is made up of nonuniform gravitational field phenomena. In this general sense, the single inertial sensor provides valid data only for the equipotential gravitational surface or geoid at which it is biased. That is to say, if it were suddenly dropped in free fall it would give the indication or measurement for its gravitational bias potential, which would be correct only if it were located somewhere on that equipotential surface.

The state of the navigational art accounts for this erroneous aspect of inertial sensor data by utilizing a predetermined gravitational potential function constructed by extensive observation of particular gravitational field phenomena, such as the tracking of orbiting satellites. Knowing the position of the navigational system in the gravitational field, the latter's acceleration effect upon the system can be computed from the characteristic potential function and used to compensate or correct the inertial sensor data. This potential function technique proves to be practical in the presence of a known gravitational field, but it collapses to a mere two dimensional solution in the presence of unknown masses or unknown mass anomalies.

It is an object of this invention, therefore, to resolve this dilemma of inertial navigation by disclosing a navigational sensing unit which circumvents the necessity of a predetermined gravitational potential and measures directly the acceleration due to gravitational field phenomena by updating the gravitational acceleration vector with the empirically determined elements of the gravitational gradient tensor. In general terms, nonuniform spatial variations in acceleration phenomena of any observable tensor rank and order are used to account for local perturbations which are not detected by individual inertial sensors.

By means of a plurality of single inertial sensors, differential inertial sensors, or rotational inertial sensors, gravitational variations characterizing the nonuniform properties of the gravitational field can be determined. These variations, in turn, are sufficient to provide an accurate adjustment of the outputs of the inertial sensors in order to account for perturbations due to nonuniform gravitational field phenomena. Consideration of the variation in the gravitational gradient tensor elements, furthermore, implicitly distinguishes between actual changes in potential and simple tumbling or motion about an equipotential gravitational surface.

As an example, the sensing unit of this disclosure will indicate the actual acceleration being exerted upon it by a gravitational field if it is coasting in gravitational free fall. As it moves from the equipotential gravitational surface at which it is biased to another potential, it adjusts its output data directly to measure a magnitude of gravitational acceleration appropriate for the new gravitational field strength. It is this quality of measuring acceleration due to gravitational phenomena which makes the sensor unit noninertial, although its constituent parts are themselves inertial.

Going from the theoretical to the practical, the invention offers as one embodiment a geodesic well surveying and gravitational mapping apparatus, although embodiments in any aspect of space navigation are available within the scope of the present disclosure.

It is an object of this invention to provide a gimballess, non-gyroscopic surveying-navigation instrument which provides information about its position, velocity, acceleration, and attitude as it moves from one location to another.

An object of this invention is to provide a new and improved surveying-navigation instrument which provides an instantaneous and continuous three dimensional plot of the path travelled by the movable portion of the instrument from one location to another.

An equally important object of this invention is to provide a new and improved surveying-navigation instrument which provides an instantaneous and continuous three dimensional plot of the acceleration caused by gravitational fields acting on the instrument as it may or may not be accelerated from one location to another.

A further object of the invention is to provide a new and improved well surveying-navigation instrument which may be lowered in a well to sense the course of the well and create a three dimensional plot of the well.

Another object of the invention is to provide a new and improved down hole gravity meter which provides a three dimensional plot of the gravitational field acting on the instrument as it is lowered in a well while undergoing nonuniform acceleration.

A further object of this invention is to provide a new and improved gimballess surveying-navigation instrument which provides an instantaneous and continuous three dimensional plot of the path travelled by the instrument from one location to another.

Yet another object of this invention is to provide a well surveying-navigation instrument which provides instantaneous and continuous data at the surface of a well concerning the course of the well.

Still a further object of this invention is to provide a new and improved surveying-navigation instrument which senses all absolute acceleration in inertial space to derive the location of the instrument by twice integrating the total acceleration.

Still another object of this invention is to provide a new and improved surveying-navigation instrument which includes means sensing relative translational acceleration of the instrument and non-gyroscopic means determining rotational parameters to derive information concerning translation of the instrument in space.

Yet another object of this invention is to provide a new and improved noninertial surveying-navigation instrument which senses acceleration caused by gravitational fields acting on the instrument.

An important object of this invention is to provide a new and improved gravity meter in which differences detected between pairs of accelerometers located at different elevations are indicated.

Still another object of this invention is to provide a new and improved gravitational mass sensing means in which differential inertial sensors determine the characteristics of gravitational mass anomalies present as well as the properties of existing gravitational fields, while undergoing any form of motion and particularly accelerated free fall.

Still another object of this invention is to provide a new and improved surveying-navigation instrument in which accelerometer output signals are manipulated to derive a continuous three dimensional plot of the path of the instrument, and which also provides information relating to the acceleration caused by gravitational fields acting on the instrument.

Yet another object of this invention is to provide a new and improved inertial surveying-navigation instrument in which gravitational and nongravitational acceleration effects can be separated and distinguished between.

An important object of this invention is to provide a new and improved method for determining nonuniform gravitational acceleration effects by purely inertial sensing means, as well as determining three dimensional gravitational distance.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1A is an illustration of the gravitational gradient phenomenon;

FIG. 3 is a view partly in section and partly in elevation, of a Coriolis acceleration generator;

FIG. 4 is an exploded isometric view of the sensor unit having the inertial sensors of FIG. 2A;

FIG. 5 is a fragmentary sectional view of the central portion of the sensor unit of FIG. 4;

FIG. 6 is a side view of FIG. 5;

FIG. 7 is a sectional view of one end of the housing;

FIG. 11 is a schematic block diagram of an inertial surveying-navigation system utilizing signals supplied by the surveying instrument.

A complete understanding of the invention is obtained by examining the theory of operation of the invention as expressed in mathematical terms, after which, particular embodiments constructed and programmed in accordance with the mathematical terms will be considered.

COMPARISON OF GRAVITATIONAL GRADIENT TECHNIQUES WITH POTENTIAL FUNCTION TECHNIQUES

Figure 1:
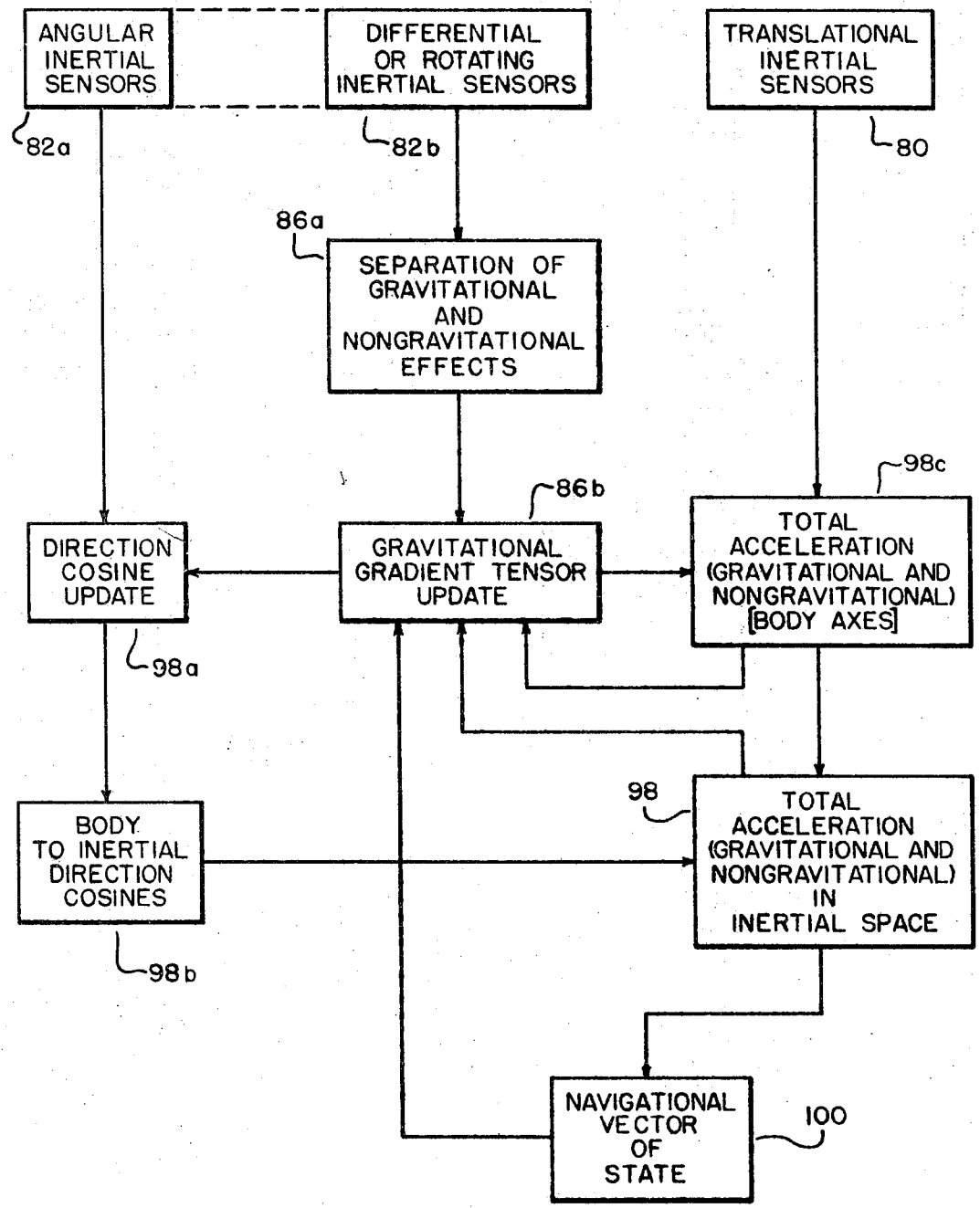
FIG. 1 is a functional representation of the basic theory of the instrument.

For a better understanding of the theoretical mathematics involved in navigation with gravitational field gradients, attention is first called to FIG. 1 and FIG. 1A. FIG. 1 is a simplified representation of the basic theory of the disclosure, which will be discussed in detail later. FIG. 1A, in the meantime, represents the gravitational gradient phenomenon, an understanding of which is essential to any consideration of FIG. 1.

Gravitational gradient navigation can be broken down into two basic cases: Navigation in the presence of a single gravitational potential function, and navigation in the presence of multiple gravitational potential functions. Referring to FIG. 1A, a potential $\Phi$ is illustrated in an inertial $X,Y,Z$ reference system, with a moving $x,y,z$ frame of reference within the influence of a single mass.

The gravitational potential is defined as a function of position by $\Phi(X,Y,Z)$ and the gravitational field strength is defined by $\overline{G}(X,Y,Z)$. The values of the partial derivatives of $\Phi(X,Y,Z)$ are $G_X$, $G_Y$, $G_Z$ which represent the components of $\overline{G}$, a vector quantity, at any point in space. By definition, $$\overline{G} = G_X \overline{I} + G_Y \overline{J} + G_Z \overline{K} \qquad (1)$$

$$\overline{G} = -\nabla \Phi = -(\overline{I}\Phi_X + \overline{J}\Phi_Y + \overline{K}\Phi_Z) \qquad (2)$$

where the parametric subscripts X, Y, Z are used in conformity with a rectangular inertial reference system $X,Y,Z$ located at the center of gravitational influence and defined by the right-handed unit orthogonal vectors $\overline{I}, \overline{J}, \overline{K}$.

The space rate of change of gravitation $d\overline{G}/d\overline{R}$ in the inertial $X,Y,Z$ frame, where $\overline{R}$ represents the position of some point in the gravitational field with its center located at the origin of the inertial space $X,Y,Z$.

$$\overline{R} = R_X \overline{I} + R_Y \overline{J} + R_Z \overline{K} \qquad (3)$$

is a tensor function and is defined as:

$$\frac{d\overline{G}}{d\overline{R}} = \begin{bmatrix} \frac{\partial G_X}{\partial x} & \frac{\partial G_X}{\partial y} & \frac{\partial G_X}{\partial z} \\ \frac{\partial G_Y}{\partial x} & \frac{\partial G_Y}{\partial y} & \frac{\partial G_Y}{\partial z} \\ \frac{\partial G_Z}{\partial x} & \frac{\partial G_Z}{\partial y} & \frac{\partial G_Z}{\partial z} \end{bmatrix} = \begin{bmatrix} -\Phi_{XX} & -\Phi_{XY} & -\Phi_{XZ} \\ -\Phi_{YX} & -\Phi_{YY} & -\Phi_{YZ} \\ -\Phi_{ZX} & -\Phi_{ZY} & -\Phi_{ZZ} \end{bmatrix} \qquad (4)$$

Furthermore, from the harmonicity of the elements about the diagonal of the matrix (4), it may be shown that Laplace's equation is satisfied in that portion of space not occupied by mass and that the sum of the principal diagonal elements is zero; also, $$\text{CURL}(\nabla \Phi) = 0 \qquad (5)$$

for any scalar function of position $\Phi(X,Y,Z)$. The components of such a zero vector must also be zero which implies that $$\Phi_{IJ} = \Phi_{JI} \qquad (6)$$

or that the tensor (4) is symmetric in this ideal case. Thus, differentiating the potential function will yield tensor (4) which, all terms not being independent, contains the desired information about the gravitational field. In the general case, however, the potential function $\Phi(X,Y,Z)$ need not be scalar, which is true if there are discontinuities in the field, and consequently the tensor (4) is not necessarily symmetric.

The basic characteristics of the gravitational potential function discussed above in terms of the inertial $X,Y,Z$ frame do not change when considered from the point of view of the moving frame of reference $x,y,z$ as long as the latter is moving in the presence of only one potential. That is, the apparent gravitational potential $\phi(x,y,z)$ is still a function of position and the apparent gravitational field strength $\overline{g}(x,y,z)$ can be defined in terms of components in a moving right-handed triad of orthogonal unit vectors $\overline{i}, \overline{j}, \overline{k}$:

$$\overline{g} = g_x \overline{i} + g_y \overline{j} + g_z \overline{k} \qquad (1a)$$

$$\overline{g} = -\nabla \phi = -(\overline{i}\phi_x + \overline{j}\phi_y + \overline{k}\phi_z) \qquad (2a)$$

The position vector in the moving $x,y,z$ frame is likewise similar, $$\overline{r} = r_x \overline{i} + r_y \overline{j} + r_z \overline{k} \qquad (3a)$$

which leads to an analogous space rate of change of gravitation $d\overline{g}/d\overline{r}$ $$\frac{d\overline{g}}{d\overline{r}} = \begin{bmatrix} \frac{\partial g_x}{\partial x} & \frac{\partial g_x}{\partial y} & \frac{\partial g_x}{\partial z} \\ \frac{\partial g_y}{\partial x} & \frac{\partial g_y}{\partial y} & \frac{\partial g_y}{\partial z} \\ \frac{\partial g_z}{\partial x} & \frac{\partial g_z}{\partial y} & \frac{\partial g_z}{\partial z} \end{bmatrix} = \begin{bmatrix} -\phi_{xx} & -\phi_{xy} & -\phi_{xz} \\ -\phi_{yx} & -\phi_{yy} & -\phi_{yz} \\ -\phi_{zx} & -\phi_{zy} & -\phi_{zz} \end{bmatrix} \qquad (4a)$$

Furthermore, the remaining properties hold true:

$$\text{CURL}(\nabla \phi) = 0 \qquad (5a)$$

and $$\phi_{ij} = \phi_{ji} \qquad (6a)$$

The importance of the above discussion is to point out that invariance of the basic properties of the model can be assumed for a single gravitational potential, whether observed from the inertial $X,Y,Z$ system or the moving $x,y,z$ system: $\Phi(X,Y,Z) = \phi(x,y,z)$. Such an assumption amounts to stating that the magnitude of gravitational field strength $G$ in FIG. 1A must be equivalent to the magnitude $g$ in the moving $x,y,z$ navigational system, so long as there is only one potential surface $\Phi(X,Y,Z)$ present:

$$G = \sqrt{G_X^2 + G_Y^2 + G_Z^2} = \sqrt{g_x^2 + g_y^2 + g_z^2} = g \qquad (7)$$

Consequently, the data observed explicitly in the moving system is sufficient to realize the basic intentions of this disclosure and properly compensate the inertial sensor measurements for nonuniform gravitational acceleration effects. This approach avoids transformations first into the inertial space $X,Y,Z$ to determine the new gravitational field strength $\overline{G}(X,Y,Z)$ and then transformation back into the moving $x,y,z$ system to provide the $\overline{g}(x,y,z)$ vector.

The relation between the apparent gravitational potential seen as $\Phi(X,Y,Z)$ in the inertial X,Y,Z frame and $\phi(x,y,z)$ in the moving x,y,z frame is established by the direction cosine transformation between the two coordinate systems:

$$\begin{bmatrix} r_x \\ r_y \\ r_z \end{bmatrix} = [\cos \lambda_{ij}] \begin{bmatrix} R_x \\ R_y \\ R_z \end{bmatrix} \quad (8)$$

Figure 1B:
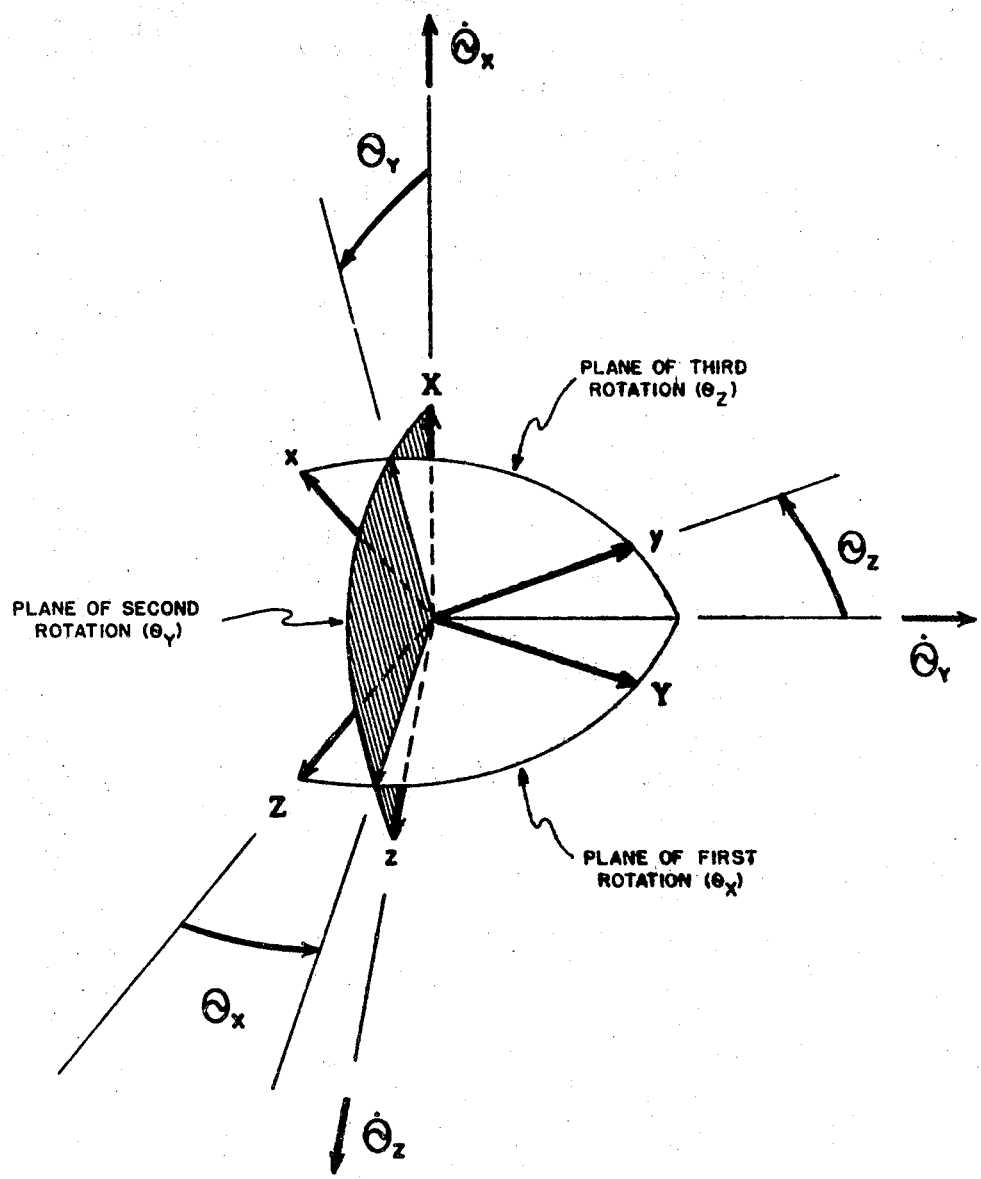
FIG. 1B is a representation of the convention used for frames of reference.

This model implicitly assumes that the classical notion of apparent or fictitious inertial or nongravitational forces does not carry over to gravitational ones, although such a model might indeed account for non-Newtonian secular accelerations in a satisfactory fashion. The mathematical statement of Equation 8 is illustrated in FIG. 1B, which shows an instantaneous attitude of the $x,y,z$ frame as it moves about the inertial X,Y,Z frame.

For purposes of illustration only, the potential function in FIG. 1A is sometimes assumed to be Newtonian:

$$\Phi - (R) = \frac{-KM}{\sqrt{R_x^2 + R_y^2 + R_z^2}} = -\frac{KM}{R} \quad (9)$$

where K is the universal gravitation constant and M the mass producing the gravitational effect. Taking partial derivatives, tensor (4) becomes $$\frac{d\overline{G}}{d\overline{R}} = \frac{KM}{R^5} \begin{bmatrix} -R^2 + 3R_X^2 & 3R_XR_Y & 3R_XR_Z \\ 3R_XR_Y & -R^2 + 3R_Y^2 & 3R_YR_Z \\ 3R_XR_Z & 3R_YR_Z & -R^2 + 3R_Z^2 \end{bmatrix} \quad (10)$$

In other words, a solution for the value of $R_X, R_Y, R_Z$ yields a solution of the whole matrix. Also, it is to be noted that if the position R is on one of the inertial axes, such as the X-axis, then $R_X = R$ and $R_Y = R_Z = 0$, reducing the matrix to $$\frac{d\overline{G}}{d\overline{R}} = \frac{KM}{R_X^3} \begin{bmatrix} 2 & 0 & 0 \\ 0 & -1 & 0 \\ 0 & 0 & -1 \end{bmatrix} \quad (11)$$

and it then follows in the special case where $R_X = R$ that $$-\Phi_{XX} = \frac{2KM}{R^3} \quad (12)$$

Equation 12 gives the magnitude of $\Phi_{XX}$ at the point in question, and, in conjunction with Newton's law of gravitation, the solution for $\overline{G}$ can be obtained for the special case by integrating. Similar reasoning applies to the moving x,y,z frame of reference, with the two potential functions $\Phi(X,Y,Z)$ and $\phi(x,y,z)$ being related by the position vectors $\overline{R}(X,Y,Z)$ and $\overline{r}(x,y,z)$ as in Equation 8.

A more general representation of the gravitational field effect can be taken from another conventional model in potential theory, which includes perturbations due to mass oblateness as well as secular accelerations:

$$\Phi(R\theta\gamma) = \frac{-KM}{R} \left[ 1 + \sum_{n=1}^{\infty} \left(\frac{a}{R}\right)^m \sum_{m=0}^{\infty} P_{nm}(\sin \theta)\{C_{mn}(\cos_m \gamma) + S_{nm}(\sin_m \gamma)\} \right] \quad (13)$$

where $a$ is some constant, $\theta$ and $\gamma$ are the angles associated with spherical coordinates, and $P_{nm}$, $C_{nm}$ and $S_{nm}$ are the possible coefficients of the spherical harmonics associated with the gravitational field in concern. With observational data from such techniques as the tracking of vehicles or satellites orbiting in the gravitational field, the various coefficients can be determined to a limited number of places. Then by taking the partial derivatives, as was accomplished in Equation 2, an expression for the gravitational field strength $\overline{G}$ is determined for any known position in the potential $\Phi(R,\theta,\gamma)$ of Equation 13. From that value of gravitational field strength, inertial sensor outputs, which are insensitive to variations in the gravitational field strength, can be corrected to arrive at the actual acceleration encountered by the sensors. By means of an onboard computer, then, a vehicle can store the empirical potential function of Equation 13, and continuously correct the misleading data it receives from the inertial sensors in its navigation system while moving in a known gravitational field.

In contrast, the embodiment of this disclosure is not confined to such a technique. By means of gravity gradient navigation, the potential function approach can be circumvented and the inertial sensor data corrected directly for nonuniform gravitational effects; alternatively, the bias of the inertial sensors themselves can be adjusted by the measured spatial gravitational variations.

It is precisely this ability to circumvent the empirical potential function technique employed in inertial navigation that constitutes the differentiating quality of this disclosure, made possible by the nonuniform properties of gravitational fields.

The theoretical basis for compensation of inertial sensor outputs with gravitational gradient measurements is a relatively simple one. The spatial separation of any plurality of inertial sensors which creates the gravitational gradient phenomenon of FIG. 1A in the presence of nonuniform fields is the very thing that allows for the measurement of nonuniform gravitational acceleration. The very physical structure of the sensing unit guarantees that a certain number of inertial sensors exist at a future gravitational state of the center of inertial mass of the unit as a whole.

Or more generally, the very ponderable structure of an inertial mass moving in the presence of nonuniform acceleration phenomena guarantees that the difference in its uniform inertial behavior can be attributed to a future state of the center of inertial mass.

This means that the gravitational field strengths $\overline{g}(x,y,z)$ and $\overline{G}(X,Y,Z)$ for a single potential can be modified in a straightforward fashion:

$$\begin{bmatrix} g_x \\ g_y \\ g_z \end{bmatrix}_{n+1} = \begin{bmatrix} g_x \\ g_y \\ g_z \end{bmatrix}_n + \begin{bmatrix} \Delta g_x \\ \Delta g_y \\ \Delta g_z \end{bmatrix}_n \quad (14a)$$

$$\begin{bmatrix} G_X \\ G_Y \\ G_Z \end{bmatrix}_{n+1} = \begin{bmatrix} G_X \\ G_Y \\ G_Z \end{bmatrix}_n + \begin{bmatrix} \Delta G_X \\ \Delta G_Y \\ \Delta G_Z \end{bmatrix}_n \quad (14b)$$

where the matrix subscripts $(n)$ and $(n+1)$ denote the particular sets of instantaneous data concerned, while $$\overline{\Delta g} \text{ and } \overline{\Delta G}$$

constitute the compensation. The relation between the apparent field strength in the $x,y,z$ and X,Y,Z systems, assuming fictitious gravitational forces do not exist, is given by $$\begin{bmatrix} g_x \\ g_y \\ g_z \end{bmatrix} = [\cos \lambda_{ij}] \begin{bmatrix} G_X \\ G_Y \\ G_Z \end{bmatrix} \quad (14c)$$

Assuming the translational inertial sensors in the sensing unit are all biased to the same gravitational field strength $g_0(x,y,z) = G_0(X,Y,Z)$, then the compensation required for any given $(n+1)$ set of instantaneous translational inertial data from the sensors is expressed by $$g_{n+1} = g_0 + \Sigma \Delta g_n$$

Any drift in bias due to sensor error is easily accounted for by proper adjustment of the initial condition $g_0$ in Equation 15. For the general case of the rotational inertial sensors, compensation for gravitational gradients is a second rank tensor. Alternatively, vectorial compensation can be used as long as proper modulation during rotation is accounted for, and the difference in apparent field strength stated in Equation 14 is considered.

By determining the dynamic behavior of the unit from its previous states, or its class of motion, proper initialization predicts the gravitational field strength and its associated potential for the first increment of motion and compensations are made accordingly. Each subsequent increment is handled in the same fashion, the process being limited mainly by the granularity of the computation rate and the manner or numerical scheme with which the measurements of the gravitational gradients are used to update the gravitational field strength of the initial bias.

The compensation vectors $$\overline{\Delta g} \text{ and } \overline{\Delta G}$$

in Equations 14a and 14b are determined from the partial derivatives of tensor (4) or (4a) by some optimization method and numerical integration technique. For the purposes of this disclosure, it will suffice to state, as an example, that there exists an operator $[w]$ for the moving $x,y,z$ system such that $$\begin{bmatrix} \Delta g_x \\ \Delta g_y \\ \Delta g_z \end{bmatrix}_n = k_1[\Delta g_{ij}]_n \begin{bmatrix} w_x \\ w_y \\ w_z \end{bmatrix}_n + k_2[\Delta g_{ij}]_{n-1} \begin{bmatrix} w_x \\ w_y \\ w_z \end{bmatrix}_{n-1} \quad (16a)$$

where $[\phi_{ij}] = -[\Delta g_{ij}]$. Similarly, there is an operator $[W]$ for the inertial X,Y,Z system such that $$\begin{bmatrix} \Delta G_X \\ \Delta G_Y \\ \Delta G_Z \end{bmatrix}_n = K_1[\Delta G_{IJ}]_n \begin{bmatrix} W_X \\ W_Y \\ W_Z \end{bmatrix}_n + K_2[\Delta G_{IJ}]_{n-1} \begin{bmatrix} W_X \\ W_Y \\ W_Z \end{bmatrix}_{n-1} \quad (16b)$$

wherein any number of previous state $(n-1)$, $(n-2)$, etc. can be chosen, as to insure the integrity of the update. The coefficients $k$ and $K$ and the elements of the operators $[w]$ and $[W]$ can be constants, functions of variables, or mathematical operations. Any satisfactory numerical technique within the state of the art can be used.

In other words, at any given moment in a single potential $\Phi(X,Y,Z)$ the sensor unit has associated with it a space rate of change $d\overline{G}/d\overline{R}$ in the inertial X,Y,Z frame and $d\overline{g}/d\overline{r}$ in the moving $x,y,z$ frame, expressed by Equations 4 and 4a respectively. At the same instantaneous moment, there are the corresponding position vectors $\overline{R}(X,Y,Z)$ and $\overline{r}(x,y,z)$, equivalent in magnitude and defined by Equations 3 and 3a. From a sufficient number of past states either of the position or field strength vector explicitly or of the gravitational gradient tensor elements themselves, the next succeeding state and the value of its gravitational field strength can be predicted. The compensation required to adjust the past gravitational bias value is then correlated to that incremental set of inertial sensor data, and the compensation is performed, using the relations of Equation 15, as is most expedient for the computation scheme employed.

An example of the prediction of behavior using rotational tensor elements can be found in the tumbling motion of a differential inertial sensing unit about a Newtonian gravitational equipotential surface. Assuming the elements of Equation 4a are measured in the sensor unit and are nonzero, then the following $$\left[\left(\frac{\phi xy}{\phi yz}\right)\phi xz\right] + \left[\left(\frac{\phi xy}{\phi xz}\right)\phi yz\right] + \left[\left(\frac{\phi xz}{\phi xy}\right)\phi yz\right] = -\frac{KM}{r^3} \quad (17a)$$

$$\left[\left(\frac{\phi xz}{\phi yz}\right)\phi xy\right] + \left[\left(\frac{\phi yz}{\phi xz}\right)\phi xy\right] + \left[\left(\frac{\phi yz}{\phi xy}\right)\phi xz\right] = -\frac{KM}{r^3} \quad (17b)$$

both establish a Newtonian sphere of equipotential influence $$r = \sqrt{r_x^2 + r_y^2 + r_z^2} \quad (18)$$

in the moving $x,y,z$ frame. Motion of $x,y,z$ about such a sphere, for example, does not require translational compensation.

The gravitational field strength of Equations 14a and 14b contains no ambiguity of sign in that proper initialization establishes the explicit direction of $\overline{g}(x,y,z)$ and $\overline{G}(X,Y,Z)$, and subsequent manipulation maintains that information. This point of clarification of FIG. 1A is made merely because the position vectors $$\overline{R}(+R_X, +R_Y, +R_Z)$$

and $-\overline{R}(-R_X, -R_Y, -R_Z)$ both produce the same Newtonian tensor elements as seen in the example of Equation 10.

The real world, now, is fond of surfaces of nonuniform influence due to several simultaneous potential functions, a factor which presents an additional complication to the naive models of potential theory such as Equations 9 and 13 as presented above. Under such circumstances the nonuniform gravitational environment cannot be described by one inertially referenced potential function $\Phi(X,Y,Z)$ due to a single mass. Instead, each source of gravitational influence must be represented by its own frame of reference $(X_1,Y_1,Z_1)$, $(X_2,Y_2,Z_2)$, etc., and its own potential $\Phi_1(X_1,Y_1,Z_1)$, $\Phi_2(X_2,Y_2,Z_2)$, respectively. Also, the apparent potential $\phi(x,y,z)$ seen in the moving coordinate system $x,y,z$ is no longer directly related to a single inertially referenced potential $\Phi(X,Y,Z)$ but now experiences perturbations due to all of them.

However, the nonuniform perturbations encountered by the moving $x,y,z$ system still determine the gravitational acceleration effect acting upon it in any instantaneous state of motion through multiple potentials. The gravitational field strength $\overline{g}(x,y,z)$ is still modified as in Equations 14a and 16a, but it is no longer equivalent in magnitude to the inertially referenced gravitational field strength $\overline{G}(X,Y,Z) = -\nabla \Phi(X,Y,Z)$.

The resultant acceleration in space can still be arbitrarily referenced to the original X,Y,Z inertial frame in which the inertial sensing unit $x,y,z$ was biased and initialized. This acceleration space, when twice integrated, defines the position vectors $\overline{r}(x,y,z)$ and $\overline{R}(X,Y,Z)$ of the $x,y,z$ system in the original X,Y,Z inertial frame. If so desired, a new potential $\Phi^*(X,Y,Z) = \phi(x,y,z)$ can be defined in the inertial X,Y,Z frame, but it is not necessarily equivalent to $\Phi(X,Y,Z)$.

Consequently, the theory of this disclosure determines the position vectors $\overline{r}(x,y,z)$ and $\overline{R}(X,Y,Z)$ of the $x,y,z$ system at all states in the inertial X,Y,Z frame, as well as the gravitational field strengths $\overline{g}(x,y,z)$ and $\overline{G}(X,Y,Z)$ within any gravitational influence due to known or unknown masses and mass anomalies.

A FUNCTIONAL SIMPLIFICATION OF THE DISCLOSURE

Having discussed the basic characteristics of gravitational gradient navigation as presented in this disclosure, the principles for representing the equations of motion and state of the moving $x,y,z$ navigational system with respect to the inertial X,Y,Z system must be established. Such a presentation, using the classical approach, is concerned with two fundamental relationships: the rotational equations of motion, and the translational equations of motion.

The rotational equations of motion, referring now to FIG. 1B, are concerned with establishing the attitude of the $x,y,z$ frame of reference with respect to the X,Y,Z inertial space at any instantaneous state of rotation. Such a transformation between moving and inertial attitude has been given previously in Equation 8. Briefly, then, the rotational equations of motion of any navigation system must be concerned with the determination of the nine elements of three-dimensional inertial-to-moving attitude transformation matrix used in Equation 8:

$$\begin{bmatrix} r_x \\ r_y \\ r_z \end{bmatrix} = [\cos \lambda_{ij}] \begin{bmatrix} R_X \\ R_Y \\ R_Z \end{bmatrix} \quad (8)$$

One of the classical techniques for expressing the linear orthogonal attitude transformation of Equation 8 is found in the convenient notation of Euler angles. Although the latter do not provide a complete solution to the problem, due to a mathematical singularity, they do demonstrate that the notion of simulated inertial space in the presence of gravitational field phenomena has long been within the state of the theoretical art.

Simulated inertial space amounts to the inertial X,Y,Z frame of reference that has been discussed so far. All navigational data is sensed in terms of some moving $x,y,z$ system which translates and rotates in space. To simulate the X,Y,Z frame is simply to maintain its translational position and rotational attitude with respect to any instantaneous state of the moving $x,y,z$ system from such data, in the presence of any acceleration phenomena.

Assuming, then, that the moving $x,y,z$ frame of reference can represent the navigational sensing means of this disclosure, a mathematical development is necessary which demonstrates how such sensor data can be used to determine the direction cosine transformation matrix of Equation 8. Gravitational gradient navigation follows as a broader consequence.

The Euler angles $\theta_x$, $\theta_y$, $\theta_z$ of FIG. 1B constitute a three-degree-of-freedom rotational sequence from the X,Y,Z inertial system into the moving $x,y,z$ navigational sensing system. Equation 8, as an expression of the relation between apparent position vectors $\bar{r}(x,y,z)$ and $\bar{R}(X,Y,Z)$ in each of these frames of reference, can be re-written as the following matrix transformation:

$$\begin{bmatrix} r_x \\ r_y \\ r_z \end{bmatrix} = \begin{bmatrix} \cos\theta_z & \sin\theta_z & 0 \\ -\sin\theta_z & \cos\theta_z & 0 \\ 0 & 0 & 1 \end{bmatrix} \begin{bmatrix} \cos\theta_y & 0 & -\sin\theta_y \\ 0 & 1 & 0 \\ \sin\theta_y & 0 & \cos\theta_y \end{bmatrix} \begin{bmatrix} 1 & 0 & 0 \\ 0 & \cos\theta_x & \sin\theta_x \\ 0 & -\sin\theta_x & \cos\theta_x \end{bmatrix} \begin{bmatrix} R_x \\ R_y \\ R_z \end{bmatrix} \quad (19a)$$

$$= \begin{bmatrix} \cos\theta_y \cos\theta_z & (\sin\theta_x \sin\theta_y \cos\theta_z + \cos\theta_x \sin\theta_z) & (-\cos\theta_x \sin\theta_y \cos\theta_z + \sin\theta_x \sin\theta_z) \\ -\cos\theta_y \sin\theta_z & (-\sin\theta_x \sin\theta_y \sin\theta_z + \cos\theta_x \cos\theta_z) & (\cos\theta_x \sin\theta_y \sin\theta_z + \sin\theta_x \cos\theta_z) \\ \sin\theta_y & -\sin\theta_x \cos\theta_y & \cos\theta_x \cos\theta_y \end{bmatrix} \begin{bmatrix} R_x \\ R_y \\ R_z \end{bmatrix} \quad (19b)$$

which is a mathematical statement of FIG. 1B. Comparison of the respective elements of the square matrix in Equation 19b with that in Equation 8 defines the three Euler angles in terms of five of the direction cosine elements of this arbitrary $\theta_x,\theta_y,\theta_z$ Euler sequence for any instantaneous state:

$$\theta_x = \tan^{-1}[-(\cos\lambda_{32})/(\cos\lambda_{33})] \quad (19c)$$
$$\theta_y = \sin^{-1}[\cos\lambda_{31}] \quad (19d)$$
$$\theta_z = \tan^{-1}[-(\cos\lambda_{21})/(\cos\lambda_{11})] \quad (19e)$$

The initial attitude $x_0,y_0,z_0$ of the moving $x,y,z$ system, furthermore, has a specific orientation with respect to the arbitrarily adopted inertial space X,Y,Z:

$$\begin{bmatrix} r_{x_0} \\ r_{y_0} \\ r_{z_0} \end{bmatrix} = \begin{bmatrix} \cos\lambda_{ij}^* \end{bmatrix} \begin{bmatrix} R_X \\ R_Y \\ R_Z \end{bmatrix} \quad (20)$$

in the event that $\bar{r}(x_0,y_0,z_0) \neq \bar{R}(X,Y,Z)$ initially.

Navigational sensing means must consist of angular sensors which determine angular rates and angular accelerations or angular changes of state. These rates have a certain relation with the elements of the desired attitude transformation matrix. Although such angular navigational data are finite increments, the classical theory of infinitesimal rotations can be used to establish the relationships between navigationally sensed rates and attitude transformation elements. Euler sequencing of the increments can eliminate the errors in this assumption.

Referring again to FIG. 1B, the Euler rates $\dot{\theta}_x$, $\dot{\theta}_y$, $\dot{\theta}_z$ illustrated represent the angular velocities of the planes of infinitesimal rotation in this Euler sequence. Utilizing the Euler rotation matrices of Equation 19a, these vectorial Euler rates $\dot{\theta}_x$, $\dot{\theta}_y$, $\dot{\theta}_z$ can be transformed either into the inertial X,Y,Z frame or the moving $x,y,z$ navigational system. Because the navigational sensors providing the data are in the $x,y,z$ frame of reference, $\dot{\theta}_x$, $\dot{\theta}_y$, $\dot{\theta}_z$ must be considered there.

The first rotational Euler rate $\dot{\theta}_x$ of FIG. 1B must be completely transformed from the inertial X,Y,Z system into the moving $x,y,z$ navigational frame:

$$\begin{bmatrix} (\omega_{\theta_x})_x \\ (\omega_{\theta_x})_y \\ (\omega_{\theta_x})_z \end{bmatrix} = \begin{bmatrix} \cos\lambda_{ij} \end{bmatrix} \begin{bmatrix} \dot{\theta}_x \\ 0 \\ 0 \end{bmatrix} \quad (21a)$$

$$= \begin{bmatrix} \dot{\theta}_x (\cos\theta_y \cos\theta_z) \\ \dot{\theta}_x (-\cos\theta_y \sin\theta_z) \\ \dot{\theta}_x (\sin\theta_y) \end{bmatrix} \quad (21b)$$

The second rotational Euler rate $\dot{\theta}_y$ of FIG. 1B need only be transformed through the last rotation matrix $(\theta_z)$ of Equation 19a:

$$\begin{bmatrix} (\omega_{\theta_y})_x \\ (\omega_{\theta_y})_y \\ (\omega_{\theta_y})_z \end{bmatrix} = \begin{bmatrix} \cos\theta_z & \sin\theta_z & 0 \\ -\sin\theta_z & \cos\theta_z & 0 \\ 0 & 0 & 1 \end{bmatrix} \begin{bmatrix} 0 \\ \dot{\theta}_y \\ 0 \end{bmatrix} \quad (21c)$$

$$= \begin{bmatrix} \dot{\theta}_y (\sin\theta_z) \\ \dot{\theta}_y (\cos\theta_z) \\ 0 \end{bmatrix} \quad (21d)$$

And the last Euler rate $\dot{\theta}_z$ requires no transformation because it is already in the $x,y,z$ frame:

$$\begin{bmatrix} (\omega_{\theta_z})_x \\ (\omega_{\theta_z})_y \\ (\omega_{\theta_z})_z \end{bmatrix} = \begin{bmatrix} 0 \\ 0 \\ \dot{\theta}_z \end{bmatrix} \quad (21e)$$

The contributions of these Euler rates $\dot{\theta}_x$, $\dot{\theta}_y$, $\dot{\theta}_z$ along each of the components of the $x, y, z$ axes must be equivalent to the angular velocity $\bar{\omega}(x,y,z)$ with which the $x,y,z$ navigational frame rotates:

$$\bar{\omega}(x, y, z) = \omega_x \bar{i} + \omega_y \bar{j} + \omega_z \bar{k} \quad (22)$$

In other words, $$\omega_x = (\omega_{\theta_x})_x + (\omega_{\theta_y})_x + (\omega_{\theta_z})_x$$

or $$\omega_x = \dot{\theta}_x (\cos\theta_y \cos\theta_z) + \dot{\theta}_y (\sin\theta_z) \quad (23a)$$

and similarly, $$\omega_y = \dot{\theta}_x (-\cos\theta_y \sin\theta_z) + \dot{\theta}_y (\cos\theta_z) \quad (23b)$$
$$\omega_z = \dot{\theta}_x (\sin\theta_y) + \dot{\theta}_z \quad (23c)$$

Consequently, the angular velocity $\bar{\omega}(x,y,z)$ of Equation 22 can be expressed in terms of the Euler angles $\theta_x$, $\theta_y$, $\theta_z$ and the Euler rates $\dot{\theta}_x$, $\dot{\theta}_y$, $\dot{\theta}_z$:

$$\bar{\omega}(x, y, z) = [\dot{\theta}_x (\cos\theta_y \cos\theta_z) + \dot{\theta}_y (\sin\theta_z)]\bar{i}$$
$$+ [\dot{\theta}_x (-\cos\theta_y \sin\theta_z) + \dot{\theta}_y (\cos\theta_z)]\bar{j}$$
$$+ [\dot{\theta}_x \sin\theta_y + \dot{\theta}_z]\bar{k} \quad (22a)$$

Provided the navigational sensing means in the moving $x,y,z$ frame of reference determine the variations in $\omega_x,\omega_y,\omega_z$ of Equation 23, then the Euler rates are found from that data as:

$$\dot{\theta}_x = \omega_x[(\cos\theta_z)/(\cos\theta_y)]$$
$$-\omega_y[(\sin\theta_z)/(\cos\theta)] \quad (24a)$$
$$\dot{\theta}_y = \omega_x[\sin\theta_z] + \omega_y[\cos\theta_z] \quad (24b)$$

$$\theta_z = -\omega_x[(\tan \theta_y)(\cos \theta_z)]$$
$$+ \omega_y[(\tan \theta_y)(\sin \theta_z)] + \omega_z \quad (24c)$$

Numerical integration of Equation 24 produces the Euler angles $\theta_x, \theta_y, \theta_z$, which in turn define the elements of the direction cosine matrix of Equation 8, as specified by Equation 19b.

In addition to the three parameter Euler notation there is another classical attitude transformation technique, the four parameter quaternion approach. Defining the quaternions as $e_1, e_2, e_3, e_4$ and their rates as $\dot{e}_1, \dot{e}_2, \dot{e}_3, \dot{e}_4$, the following expressions hold true:

$$\omega_x = 2(-e_4\dot{e}_1 - e_3\dot{e}_2 + e_2\dot{e}_3 + e_1\dot{e}_4) \quad (25a)$$
$$\omega_y = 2(-e_3\dot{e}_1 + e_4\dot{e}_2 + e_1\dot{e}_3 - e_2\dot{e}_4) \quad (25b)$$
$$\omega_z = 2(-e_2\dot{e}_1 + e_1\dot{e}_2 - e_4\dot{e}_3 + e_3\dot{e}_4) \quad (25c)$$

and the inverse is $$\dot{e}_1 = \tfrac{1}{2}(-e_4\omega_x - e_3\omega_y - e_2\omega_z) \quad (25d)$$
$$\dot{e}_2 = \tfrac{1}{2}(-e_3\omega_x + e_4\omega_y + e_1\omega_z) \quad (25e)$$
$$\dot{e}_3 = \tfrac{1}{2}(+e_2\omega_x + e_1\omega_y - e_4\omega_z) \quad (25f)$$
$$\dot{e}_4 = \tfrac{1}{2}(+e_1\omega_x - e_2\omega_y + e_3\omega_z) \quad (25g)$$

The elements of the direction cosine matrix, furthermore, are established by:

$$\cos \lambda_{11} = (e_1)^2 - (e_2)^2 - (e_3)^2 + (e_4)^2 \quad (25h)$$
$$\cos \lambda_{12} = 2[e_1e_2 + e_3e_4] \quad (25i)$$
$$\cos \lambda_{13} = 2[e_2e_4 - e_1e_3] \quad (25j)$$
$$\cos \lambda_{21} = 2[e_3e_4 - e_1e_2] \quad (25k)$$
$$\cos \lambda_{22} = (e_1)^2 - (e_2)^2 + (e_3)^2 - (e_4)^2 \quad (25l)$$
$$\cos \lambda_{23} = 2[e_2e_3 + e_4e_1] \quad (25m)$$
$$\cos \lambda_{31} = 2[e_1e_3 + e_2e_4] \quad (25n)$$
$$\cos \lambda_{32} = 2[e_2e_3 - e_1e_4] \quad (25o)$$
$$\cos \lambda_{33} = (e_1)^2 + (e_2)^2 - (e_3)^2 - (e_4)^2 \quad (25p)$$

Although the quaternion approach does add rigour to the simulation of inertial space, it does not provide the simple insight which do the Euler angles. These conventions mentioned here are only two of several mathematical techniques which exist to express attitude transformations. Any method which best lends itself to practical computation techniques will suffice.

An important point must be emphasized in regard to the qualifying paragraph of Equations 24 and 25: The navigational sensing means must be capable of measuring the angular rates $\omega_x, \omega_y, \omega_z$. The inertial sensing means of the state of the art cannot accomplish this directly in the presence of nonuniform gravitational phenomena, whereas the navigational sensing means of this disclosure can.

The translational equations of motion are concerned with establishing the translational acceleration, velocity, and position of the moving $x,y,z$ navigational system with respect to the X,Y,Z inertial space for any instantaneous state. Basically, this amounts to an extension of the rotational equations of motion which establish the relation of FIG. 1B to account for translational motion in the general case of FIG. 1A.

The translational and rotational equations of motion are related in that they both assume the following expression for an infinitesimal rotation $$\dot{\theta}$$

$$\dot{r} = (\bar{r}) \times (\dot{\bar{\theta}}) \quad (26a)$$

A continuous rotation, furthermore, is determined by a first order differential equation which defines how the direction cosine transformation matrix of Equation 8 is calculated as a function of rotational state:

$$\frac{d}{dt}\left[\cos \lambda_{ij}(t)\right] = -\begin{bmatrix} 0 & -\omega_z & \omega_y \\ \omega_z & 0 & -\omega_x \\ -\omega_y & \omega_x & 0 \end{bmatrix}\left[\cos \lambda_{ij}(t)\right] \quad (26b)$$

The rotational equations of motion, as discussed previously in Euler notation, are essentially solving the differential Equation 26b in order to determine attitude transformations, while the translational equations of motion make use of the consequence of Equation 26a to determine the general expression for acceleration.

From the concepts of infinitesimal rotations established in conventional vector theory, the rate of change of rotational state of a vector can be viewed equivalently in either the inertial X,Y,Z system or the $x,y,z$ system rotating system about $$\bar{\omega}\ (x, y, z)$$

in the following fashion:

$$\left(\frac{d\bar{S}}{dt}\right)_{XYZ} = \left(\frac{d\bar{S}}{dt}\right)_{xyz} + \bar{\omega} \times \bar{S} \quad (27)$$

where $\bar{S}$ is any arbitrary vector. Applying this property of rotating vectors to a positional vector $\bar{\rho}_r$ in the moving $x, y, z$ navigational frame, the result is $$\left(\frac{d\bar{\rho}_r}{dt}\right)_{XYZ} = \left(\frac{d\bar{\rho}_r}{dt}\right)_{xyz} + \bar{\omega} \times \bar{\rho}_r \quad (28a)$$

which can also be expressed as:

$$\bar{V}(X, Y, Z) = \bar{v}(x, y, z) + \bar{\omega} \times \bar{\rho}_r \quad (28b)$$

where $\bar{V}(X,Y,Z)$ and $\bar{v}(x,y,z)$ represent velocity vectors. In a similar manner, this expression of velocity in Equation 28b can be treated by the mathematical vector operation of Equation 27 to arrive at an expression for acceleration:

$$\left(\frac{d\bar{V}}{dt}\right)_{XYZ} = \left(\frac{d\bar{V}}{dt}\right)_{xyz} + \bar{\omega} \times \bar{V} \quad (29a)$$

which leads to $$\frac{d\bar{V}}{dt} = \left[\frac{d\bar{v}}{dt} + \frac{d}{dt}(\bar{\omega} \times \bar{\rho}_r)\right] + \bar{\omega} \times [\bar{v} + \bar{\omega} \times \bar{\rho}_r]$$
$$= \left[\frac{d\bar{v}}{dt} + \frac{d\bar{\omega}}{dt} \times \bar{\rho}_r + \bar{\omega} \times \frac{d\bar{\rho}_r}{dt}\right] + [\bar{\omega} \times \bar{v} + \bar{\omega} \times (\bar{\omega} \times \bar{\rho}_r)]$$

resulting in $$\bar{A}_{XYZ} = [\bar{a}_r* + \dot{\bar{\omega}} \times \bar{\rho}_r + \bar{\omega} \times \bar{\omega} \times \rho_r + 2\bar{\omega} \times \dot{\bar{\rho}}_r]_{xyz} \quad (29b)$$

In Equation 29b, $\bar{A}$ represents the translational acceleration of the point defined by $\bar{\rho}_r$ as it appears in the X,Y,Z system, $\bar{a}_r*$ expresses the apparent translational acceleration of the position vector $\bar{\rho}_r$ in the $x,y,z$ system, $$\dot{\bar{\omega}} \times \bar{\rho}_r$$

is the Euler or angular acceleration term, $$\bar{\omega} \times \bar{\omega} \times \bar{\rho}_r$$

is the familiar centripetal acceleration effect, and $$2\bar{\omega} \times \dot{\bar{\rho}}_r$$

is the Coriolis effect.

Allowing the position vector $\bar{\rho}_r$ to represent the locations of the navigational sensors, then Equation 29b establishes the qualitative behavior of the inertial sensing masses in inertial space.

Assuming that a satisfactory technique is employed to account for theoretical errors in inertial sensing means, then Equation 29b serves as an elementary guideline for the definition of acceleration in the presence of nonuniform acceleration phenomena. It basically states the relation between the acceleration of the point defined by the position vector as it appears in the moving $x,y,z$ frame and as it appears in the inertial $X,Y,Z$ frame. But it only represents that acceleration relative to the $x,y,z$ frame of reference, regardless of whether it is viewed from inertial space or not.

If a mathematically complete picture is desired, the acceleration behavior stated in Equation 29b must be modified to accout for variations in the $\bar{R}(X,Y,Z)$ position vector in order to express any translational acceleration of the $x,y,z$ navigational system with respect to inertial space that is not defined by $\overline{a_r}^*$. This amounts to the addition of a term $$\ddot{\bar{R}}$$

to Equation 29b:

$$\bar{A} = \overline{a_r}^* + \dot{\bar{\omega}} \times \bar{p_r} + \bar{\omega} \times \bar{\omega} \times \bar{p_r} + 2\bar{\omega} \times \dot{\bar{p_r}} + \ddot{\bar{R}} \quad (30)$$

With these qualitative beginnings, attention can be turned to FIG. 1 which represents a simplified version of the basic theory of the disclosure.

FIG. 1 illustrates a strapped-down navigational device which employs both angular and translational inertial sensing means to determine the inertial uniform properties of the acceleration environment, as does the state of the art. It differs, however, from the state of the art in two closely related ways. First of all, the disclosure attempts only to simulate inertial space $X,Y,Z$ rather than to realize it physically with a stabilized platform. This strapped-down technique is then augmented with the methods of gravitational gradient navigation as presented in this disclosure, producing a noninertial navigational system which is sensitive to nonuniform gravitational perturbations.

The strapped-down inertial sensing means of this disclosure simulate the inertial $X,Y,Z$ space in the absence of nonuniform gravitational phenomena in the following fashion. The angular inertial sensors 82a of FIG. 1 determine the incremental variations in angular velocity with which to derive the proper rotational transformation matrix of Equation 8, using any of the mathematical and numerical techniques discussed previously. From some practical number of past values of the elements of the direction cosine matrix [cos $\lambda_{ij}$], the inertially sensed angular increments for the present rotational state can be employed to update the matrix to its current value.

A numerical solution of Equation 26b using standard computational means within the art will suffice. This equation can be re-written as a general differential equation for any one direction cosine element:

$$\frac{d}{dt}[\cos \lambda_{ij}(n)] = [\omega_{i+2}(n)][\cos \lambda_{i+1,j}(n)]$$
$$- [\omega_{i+1}(n)][\cos \lambda_{i+2,j}(n)] \quad (26c)$$

where $i$ is the navigational "body" axis of the moving $x,y,z$ system ($i=1=x$; $i=2=y$; $i=3=z$; $i+1=4=x$; $i+1=5=y$), while $j$ is associated with the inertial axes of $X,Y,Z$ space ($j=1=X$; $j=2=Y$; $j=3=Z$), and $n$ denotes the present state of the variables.

For the sake of example, a numerical algorithm follows, which demonstates that the solution of Equation 26c presently exists in the art:

$$[\cos \lambda_{ij}(n)] = [\cos \lambda_{ij}(n-1)] + [\Delta\cos \lambda_{ij}(n)]$$
$$+ \{a_1[\cos \lambda_{ij}(n-1)][1-\cos \lambda^2_{1,j}(n-1)$$
$$- \cos \lambda^2_{2,j}(n-1) - \cos \lambda^2_{3,j}(n-1)]$$
$$- a_2[\cos \lambda_{i,1}(n-1)\delta_{3,j}$$
$$+ \cos \lambda_{i,3}(n-1)\delta_{1,j}]$$
$$\cdot [\cos \lambda_{11}(n-1)\cos \lambda_{13}(n-1)$$
$$+ \cos \lambda_{21}(n-1) \cos \lambda_{23}(n-1)$$
$$+ \cos \lambda_{31}(n-1)\cos \lambda_{33}(n-1)]\} \quad (31a)$$

where cos $\lambda_{ij}(n)$ is the present value of the direction cosine, cos $\lambda_{ij}(n-1)$ is the previous value of the direction cosine, $a_1$ and $a_2$ are constants, $\delta_{ij}=1$ for $i=j$, and $\delta_{ij}=0$ for $i \neq j$. The integration of the direction cosine derivative of Equation 26c can be represented by means of a Runge-Kutta approximation:

$$\Delta\cos \lambda_{ij}(n) = \frac{1}{2}[\omega_{i+2}(n-1) + \omega_{i+2}(n)$$
$$+ \omega_i(n-1)\omega_{i+1}(n)]\cos \lambda_{i+1,j}(n-1)$$
$$- \frac{1}{2}[\omega_{i+1}(n-1) + \omega_{i+1}(n)$$
$$- \omega_i(n-1)\omega_{i+2}(n)]\cos \lambda_{i+2,j}(n-1)$$
$$- \frac{1}{2}[\omega_{i+2}(n-1)\omega_{i+2}(n)$$
$$+ \omega_{i+1}(n-1)\omega_{i+1}(n)]\cos \lambda_{ij}(n-1) \quad (31b)$$

while $$\omega_i(n) = \frac{3}{2}[\Delta\omega_i(n)] - \frac{1}{2}[\Delta\omega_i(n-1)] \quad (31c)$$

with $\Delta\omega_i$ representing the incremental output of the "ith" axis angular inertial sensing means.

A Taylor series expansion is another way of accomplishing the incremental direction cosine update of Equation 31b:

$$\Delta\cos \lambda_{ij}(n) = [\Delta\omega_{i+2}(n)\cos \lambda_{i+1,j}(n-1)]$$
$$- [\Delta\omega_{i+1}(n)\cos \lambda_{i+2,j}(n-1)]$$
$$+ \frac{1}{2}\{-\cos \lambda_{ij}(n-1)[\Delta\omega^2_{i+2}(n) + \Delta\omega^2_{i+1}(n)]$$
$$+ \cos \lambda_{i+2,j}(n-1)[\Delta\omega_{i+2}(n)\Delta\omega_i(n)]$$
$$+ \cos \lambda_{i+1,j}(n-1)[\Delta\omega_{i+1}(n)\Delta\omega_i(n)]\} \quad (31d)$$

Having determined the proper transformation matrix by means of the above direction cosine update 98a, the translational accelerations sensed by the translational inertial sensors 80 can be transformed from the moving $x,y,z$ system into the inertial $X,Y,Z$ space 98, using the body to inertial direction cosines 98b. This solves the nongravitational acceleration problem encountered in strapped-down navigation.

However, in the presence of nonuniform gravitational accelerations the angular and translational inertial sensors 82a and 80 cannot determine the equations of rotational and translational motion. All of the inertial sensor data must be compensated for nonuniform acceleration effects as discussed previously.

To account for nonuniform gravitational acceleration effects, both the direction cosine update 98a and the data from the translational inertial sensors 80 must be compensated for these inherent errors due to gravitational phenomena. This is accomplished by means of the gravitational tensor update 86b which determines the required compensating bias necessary in order to correct the angular and translational inertial data for spatial variations in such acceleration effects.

The separation of gravitational and nongravitational effects 86a is concerned with determining the explicit magnitudes of higher ranked tensor elements with which to account for nonuniform gravitational perturbations. Such a goal can be realized by means of mathematical computations upon data sensed by differential inertial sensors 82b or by rotating inertial sensors at selected angular velocities. Upon separating these nonuniform spatial variations from uniform ones, the higher ranked tensor elements can be used in some numerical integration technique to arrive at the new gravitational field strength in the gradient tensor update 86b.

From this empirically determined gravitational field strength, corrective compensation terms are interfaced with the rotational and translational inertial data. The direction cosine update 98a expressed previously in Equation 31, or as in Equations 24 and 19, is modified to account for any improper gravitational bias of the angular inertial sensors 82a due to nonuniform gravitational variations; gravitationally dependent error terms, if they exist, can also be compensated for. The result is a set of moving to inertial direction cosines 98b with which to perform the transformation of translational acceleration data from the moving $x,y,z$ navigational system into the $X,Y,Z$ inertial space. When the data of the translational inertial sensors 80 has likewise been compensated for spatial variations in gravitational field strength 98c, the transformation is performed:

$$\begin{bmatrix} A_X \\ A_Y \\ A_Z \end{bmatrix} = \begin{bmatrix} \cos \lambda_{ji} \end{bmatrix} \begin{bmatrix} a_x \\ a_y \\ a_z \end{bmatrix} \quad (32)$$

Thus, the navigational definition of total acceleration in simulated X, Y, Z inertial space is realized in the presence of any uniform or nonuniform, gravitational or nongravitational, acceleration phenomena. Double integration transforms the simulated acceleration space into velocity space and physical space, producing inertial position. Parametric feedback of distance, acceleration, and various tensor elements is also illustrated in FIG. 1 so as to aid in the realization of gravitational gradient navigation as presented in this disclosure.

This determines the navigational vector of state, and resolves the dilemma of the determination and the transformation of motion in three dimensions.

THE NAVIGATIONAL TENSOR

Figure 2:
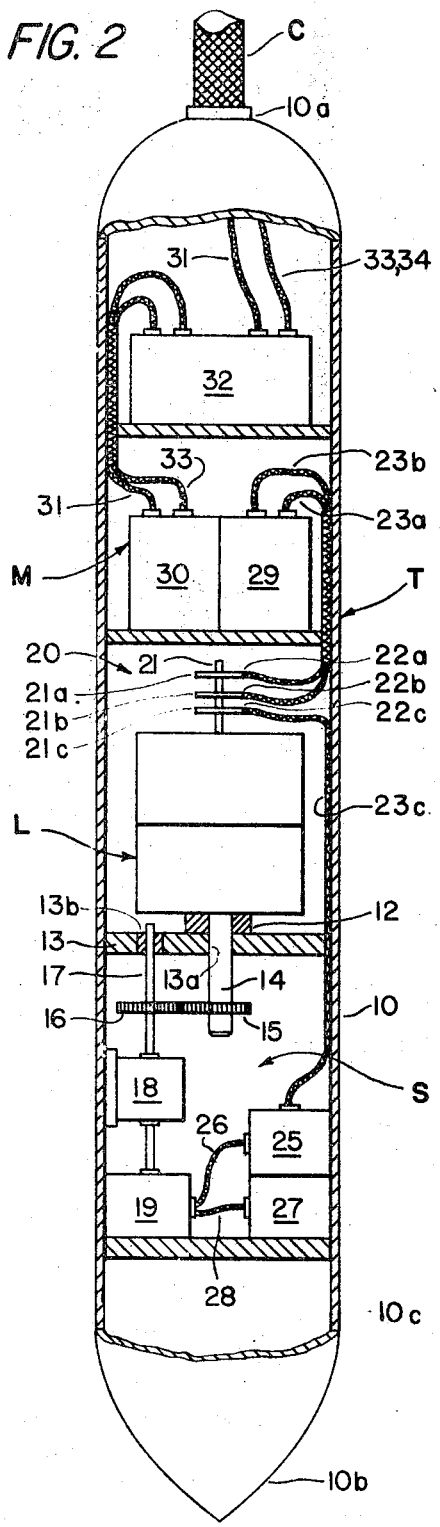
FIG. 2 is a sectional view of an oil well exploration instrument.
Figure 2A:
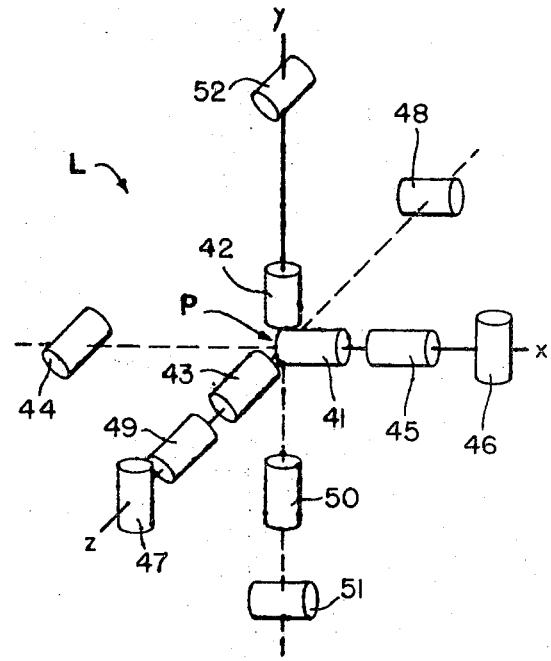
FIG. 2A is an oblique schematic view of one arrangement of a plurality of accelerometers for sensing change of motion of the instrument.

Mathematical development of the theory of operation is more meaningful when viewing FIG. 2A and considering the geometry of the sensor unit L. FIG. 2A discloses a group of inertial sensors in the preferred form of accelerometers, differential or otherwise, mounted in a fixed relationship with respect to one another as will be more evident—noting, however, that they do not have to be orthogonal. The accelerometers are placed in the sensor unit L of the navigation instrument T illustrated in FIG. 2 in order to sense change of motion as defined by the position P of the instrument in absolute or inertial space. For the purposes of the mathematics involved, it is assumed that there are three mutually perpendicular axes X, Y, Z, such as in FIG. 1A, which form a rectangular coordinate system having its origin arbitrarily located at the center of the earth (for the purposes of explanation only). A second rectangular coordinate system is defined in the instrument itself as seen in FIG. 2A, with the mutually perpendicular axes labelled $x$, $y$, $z$. The motion of the moving coordinate system (the origin P of the $x, y, z$ system in the instrument) is first mathematically found in terms of absolute acceleration with respect to the inertial space reference X, Y, Z, after which motion of the earth may be vectorially compensated to derive the actual motion of the instrument with respect to the earth, if desired. Double integration of the absolute acceleration of the instrument in inertial space yields absolute displacement of the instrument in inertial space, which may or may not be of value to an observer on earth. The displacement during the survey resulting from movement of the earth may be calculated in a computer by those skilled in the art and vectorially subtracted from absolute displacement to yield relative displacement of the instrument.

From the previous discussion, the absolute acceleration of the position P of the unit L is given by Equation 30

$$[\bar{\rho}_r = 0]$$

and is interpreted as the acceleration as it appears to an observer at the origin of the fixed coordinate system X, Y, Z. For the inertial sensing means within the unit L.

$$\bar{\rho}_r \neq 0$$

and rotational effects become apparent:

$$\bar{A} = \bar{a}_r{}^* + \dot{\bar{\omega}} \times \bar{\rho}_r + \bar{\omega} \times \bar{\omega} \times \bar{\rho}_r + 2\bar{\omega} \times \dot{\bar{\rho}}_r + \ddot{\bar{R}} \quad (30)$$

where $$\bar{\omega}$$

is the vectorial angular velocity of the $x, y, z$ coordinate system relative to the X, Y, Z coordinate system, $$\bar{\rho}_r$$

is the vector form of the position of the inertial sensing masses in the $x, y, z$ system, $\bar{R}$ is the range or distance between the origins of the X, Y, Z system and the $x, y, z$ system, and the symbol $\bar{a}_r{}^*$ is the relative translational acceleration in the $x, y, z$ system. Each of the quantities in Equation 30 represents an acceleration, as was discussed previously.

Equation 30 may be manipulated with ease after performing the vector operations indicated to obtain rectilinear coordinate components of the absolute acceleration $\bar{A}$ of any particular noninertial sensing mass:

$$A_X = a_x + (\dot{\omega}_y \rho_z - \dot{\omega}_z \rho_y) + [\omega_y(\omega_x \rho_y - \omega_y \rho_x) \\ - \omega_z(\omega_z \rho_x - \omega_x \rho_z)] + 2(\omega_y \dot{\rho}_z - \omega_z \dot{\rho}_y) \quad (32a)$$

$$A_Y = a_y + (\dot{\omega}_z \rho_x - \dot{\omega}_x \rho_z) + [\omega_z(\omega_y \rho_z - \omega_z \rho_y) \\ - \omega_x(\omega_x \rho_y - \omega_y \rho_x)] + 2(\omega_z \dot{\rho}_x - \omega_x \dot{\rho}_z) \quad (32b)$$

$$A_Z = a_z + (\dot{\omega}_x \rho_y - \dot{\omega}_y \rho_x) + [\omega_x(\omega_z \rho_x - \omega_x \rho_z) \\ - \omega_y(\omega_y \rho_z - \omega_z \rho_y)] + 2(\omega_x \dot{\rho}_y - \omega_y \dot{\rho}_x) \quad (32c)$$

The $$\ddot{\bar{R}}$$

term has been included in the $\bar{a}_r{}^*$ term of Equation 30 for the sake of simplicity, although doing so introduces an initialization error if an unknown inertial acceleration is present at the time of inertial sensor biasing. Because the $$\ddot{\bar{R}}$$

term also accounted for gravitational effects, Equations 32a through 32c are essentially stating that a noninertial sensor measures gravitational acceleration.

The accelerometers shown in FIG. 2A measure various quantities to solve the Equations 32a through 32c by supplying known measurements which can be compensated for substitution therein. Or more directly, Equation 32 may be used:

$$\begin{bmatrix} A_X \\ A_Y \\ A_Z \end{bmatrix} = \begin{bmatrix} \cos \lambda_{ji} \end{bmatrix} \begin{bmatrix} a_x \\ a_y \\ a_z \end{bmatrix} \quad (32)$$

noting that $\bar{a}_r{}^*$ of Equation 30 must not be mistaken for $\bar{a}(a_x, a_y, a_z)$ of Equation 32.

In the preferred embodiment, up to nine additional accelerometers 44–52 are preferably located at some multiple of a unit distance $\rho$ measured along one of the axes with the sensitive axis of each accelerometer parallel to one of the accelerometers 41, 42, or 43. Accelerometers 45, 48, and 51 are parallel to accelerometer 41; accelerometers 46, 47, and 50 have their sensitive axes parallel to accelerometer 42; and accelerometers 44, 49, and 52 measure acceleration parallel to accelerometer 43. Of course, the plurality of accelerometers shown in FIG. 2A may be rotated collectively or in part any number of degrees about an axis without altering the operation of the invention, and may be initially parallel to the X, Y, Z system as a matter of convenience.

If the output of the $n$th accelerometer is represented by $Q_n$, the difference between the signals of two accelerometers positioned on some axis with their sensitive axes perpendicular to that axis is derived from Equation 30 and is given by $Q_{n_1-n_2}$ as follows:

$$\Delta Q_{41-48} = \rho[(\dot{\omega}_y + \omega_x \omega_z) + \Delta g_{xz}] \quad (33a)$$

$$\Delta Q_{41-51} = \rho[(-\dot{\omega}_z + \omega_x \omega_y) + \Delta g_{xy}] \quad (33b)$$

$$\Delta Q_{42-46} = \rho[(\dot{\omega}_z + \omega_x \omega_y) + \Delta g_{yx}] \quad (33c)$$

$$\Delta Q_{42-47} = \rho[(-\dot{\omega}_x + \omega_y \omega_z) + \Delta g_{yz}] \quad (33d)$$

$$\Delta Q_{43-44} = \rho[(-\dot{\omega}_y + \omega_x \omega_z) + \Delta g_{zx}] \quad (33e)$$

$$\Delta Q_{43-52} = \rho[(\dot{\omega}_x + \omega_y\omega_z) + \Delta g_{zy}] \quad (33f)$$

$$\Delta Q_{41-45} = -\rho[(\omega_y^2 + \omega_z^2) + \Delta g_{xx}] \quad (33g)$$

$$\Delta Q_{42-50} = -\rho[(\omega_x^2 + \omega_z^2) + \Delta g_{yy}] \quad (33h)$$

$$\Delta Q_{43-49} = -\rho[(\omega_x^2 + \omega_y^2) + \Delta g_{zz}] \quad (33i)$$

which constitutes a statement of the second rank navigational tensor observed by the differential inertial sensing means as presented in this disclosure.

It is to be noted that the $\Delta g_{ij}$ term above is the gravity gradient term which further constitutes the direct empirical measurement of the elements of the gravitational gradient tensor in Equation 4a. It is a manifestation of a variation in the parameter $j$ ($\rho_x$, $\rho_y$, $\rho_z$) in the sensor unit and is present in each of the Equations 33a through 33j because the accelerometers $Q_{n_1}$ and $Q_{n_2}$ are displaced from one another and are sensitive in the $i$th direction.

In a scalar field, $\Delta g_{ij} = \Delta g_{ij}$, as specified in Equation 6a for the $x,y,z$ navigational system.

Equations 33a through 33i disclose nine equations in nine unknowns, assuming that a computer is available that solves for the derivative or the integral of the angular rates, as the case may be. The $\Delta g_{ij}$ terms may be omitted from the navigational tensor if the instrument is in inertial space with either no gravitational fields or in a strictly uniform gravitational field; however, this assumption is not true at or near the surface of the earth, so these terms are preferably retained to be summed in accordance with the equations developed hereinafter.

A solution of the differential navigational tensor of Equations 33a through 33i is concerned with both the separation of the gravitational gradient tensor $[\Delta g_{ij}]$ and with the determination of the angular velocity $$\bar{\omega}(x, y, z)$$

and angular acceleration $$\dot{\bar{\omega}}(x, y, z)$$

in the presence of gravitational perturbations $\Delta g_{ij}$, in order to define the rotational equations of motion. Such rotational equations, in turn, give the inertial to moving direction cosine transformation matrix of Equation 8.

The basic property of these equations which is important is the correlation between the indices and the signs of the centripetal terms $[\omega_i\omega_j\rho]$ and the gravitational gradient elements $[\Delta g_{ij}]$. It would appear that they are indistinguishable, but such is not the case. From the symmetry of the equations, using cyclic permutation, $$\Delta Q_a = \rho(\dot{\omega}_j) + \rho[\omega_i\omega_k + \Delta g_{ik}] \quad (34a)$$

$$\Delta Q_b = \rho(-\dot{\omega}_j) + \rho[\omega_k\omega_i + \Delta g_{ik}] \quad (34b)$$

the angular acceleration $$\dot{\omega}_j$$

is determined by differencing $$\dot{\omega}_j = 1/2[\Delta Q_a - \Delta Q_b]/[\rho] \quad (34c)$$

which, when integrated, gives the angular velocity $\omega_j$:

$$\omega_j = \int \dot{\omega}_j dt \quad (34d)$$

Performing the integration simultaneously for three dimensions $i$, $j$, $k$, the various products $\omega_i\omega_k$ are defined. Then, the sum of cyclic Equations 34a and 34b $$[\Delta Q_a + \Delta Q_b] = 2\rho[\omega_i\omega_k + \Delta g_{ik}] \quad (34e)$$

gives the off-diagonal elements ($i \neq k$) of the gravitational gradient tensor:

$$\Delta g_{jk} = \frac{1}{2}[\Delta Q_a + Q_b - 2\rho\omega_i\omega_k]/[\rho] \quad (34f)$$

Knowing $\omega_i$ determines also $\omega_i^2$ which produces the diagonal terms:

$$\Delta g_{ii} = [\Delta Q_c + \rho(\omega_j^2 + \omega_k^2)] \quad (34g)$$

The solution of the unknowns in the differential tensor Equations 33a through 33i may also be gained by including one or more Coriolis acceleration generators in the sensor unit L, rotating at any arbitrary constant velocity $\Omega$. An inertial sensor 53 (FIG. 3) is placed on a crankshaft 54 driven by a motor 55 with the sensitive axis of the inertial sensor 53 and the rotation vector $$\bar{\Omega}$$

extending along the $i$th axis. FIG. 3 illustrates an inertial sensor $53_z$ sensitive in the $z$ direction and the vector $$\bar{\Omega}_z$$

extends in the $z$ direction also.

The motor 55 may be operated at a rate of speed such that $$\Omega_i \gg \omega_i \text{ and } \Omega_i\omega \gg \dot{\omega}$$

and assuming that the gravity gradient $\Delta g_{ij}$ is small, the difference $\Delta Q_{53x-41}$ between the readings of accelerometers $53x$ and $41$ is:

$$\Delta Q_{53-41} = 2\Omega_x(\rho_y\omega_y + \rho_z\omega_z) + \dot{\omega}_y\rho_z - \dot{\omega}_z\rho_y + \omega_x(\rho_y\omega_y + \rho_z\omega_z)$$

$$\approx 2\Omega_x(\rho_y\omega_y + \rho_z\omega_z) = \bar{\rho}_a \cdot \bar{\omega}\Omega_x \quad (35a)$$

The term $$\bar{\rho}_a$$

is defined as $$\bar{\rho}_a = \rho(\bar{j}\cos\Omega_x t + \bar{k}\sin\Omega_x t), \text{ where } \bar{i}, \bar{j}, \bar{k}$$

where $\bar{i}, \bar{j}, \bar{k}$ are unit vectors defined along the $x$, $y$, $z$ axes. In like manner, the terms $$\bar{\rho}_b = \rho(\bar{i}\cos\Omega_y t + \bar{k}\sin\Omega_y t) \text{ and } \bar{\rho}_c = \rho(\bar{i}\cos\Omega_z t + \bar{j}\sin\Omega_z t)$$

are defined and appear in developing $\Delta Q_{53y-42}$ and $\Delta Q_{53z-43}$:

$$\Delta Q_{53y-42} = 2\Omega_y(\rho_x\omega_x + \rho_z\omega_z) + \dot{\omega}_z\rho_x - \dot{\omega}_x\rho_z + \omega_y(\rho_x\omega_x + \rho_z\omega_z)$$

$$\approx 2\Omega_y(\rho_x\omega_x + \rho_z\omega_z) = \bar{\rho}_b \cdot \bar{\omega}\Omega \quad (35b)$$

$$\Delta Q_{53z-43} = 2\Omega_z(\rho_x\omega_x + \rho_y\omega_y) + \dot{\omega}_x\rho_y - \dot{\omega}_y\rho_x + \omega_z(\rho_x\omega_x + \rho_y\omega_y)$$

$$\approx 2\Omega_z(\rho_x\omega_x + \rho_y\omega_y) = \bar{\rho}_c \cdot \bar{\omega}\Omega_z \quad (35c)$$

Equations 35b and 35c were developed under the same conditions stated for Equation 35a, namely, that $$\Omega_i \gg \omega_i \text{ and } \Omega_i\omega \gg \dot{\omega},$$

and that $\Delta g_{ij}$ is small.

If Coriolis generators are placed on each of the axes $x$, $y$, $z$ in the sensor unit L, and each is operated preferably at the same speed, then $\Omega_x = \Omega_y = \Omega_z = \Omega$. Further, the time $t$ may be defined as $t = [n\pi]/[\Omega]$ so that Equations 35a, 35b, and 35c reduce to:

$$\Delta Q_{53x-41} \approx 2\rho\Omega\omega_y = K\omega_y \quad (36a)$$
$$\Delta Q_{53y-42} \approx 2\rho\Omega\omega_x = K\omega_x \quad (36b)$$
$$\Delta Q_{53z-43} \approx 2\rho\Omega\omega_x = K\omega_x \quad (36c)$$

Also, the time $t$ may be defined as $t = [(2n-1)\pi]/[2\Omega]$ so that Equations 35a, 35b, 35c reduce to:

$$\Delta Q_{53x-41} \approx 2\rho\Omega\omega_z = K\omega_z \quad (37a)$$
$$\Delta Q_{53y-42} \approx 2\rho\Omega\omega_z = K\omega_z \quad (37b)$$
$$\Delta Q_{53z-43} \approx 2\rho\Omega\omega_y = K\omega_y \quad (37c)$$

Any other suitable choices of the time $t$ may also be used. In particular, certain values of $t$ can prove selective in regard to the separation and determination of higher ranked gravitational gradient tensor elements, as a function of the angular velocity of rotation.

Those skilled in the computer art may design various configurations of components to solve Equations 32a, 32b, and 32c utilizing Equations 33a through 33i and 35a through 37c to yield components of $$\bar{\omega}$$

Once $$\bar{\omega}$$

is obtained, $$\dot{\bar{\omega}}$$

is derived from a differentiating circuit, or directly with Equation 34c, and these quantities, plus the relative translation accelerations from accelerometers 41, 42, 43 provide sufficient information to solve Equations 31 and 32, and 32a, 32b, 32c. It should be noted that the absolute acceleration $\bar{A}$ which results is still in error in that nonuniform perturbations due to the spatial variations in the navigational gravity gradient tensor $[\Delta g_{ij}]$ have not been taken into account.

Once the values of $$\bar{\omega} \text{ and } \dot{\bar{\omega}}$$

are determined, the separation and definition of the gravitational gradient tensor is easily realized. Utilizing the numerical techniques discussed previously, the gravitational field strength is updated and proper compensation is provided to the data from the inertial sensing means of the $x,y,z$ gravitational system in sensor unit L.

AN EMBODIMENT

Briefly, the surveying-navigation instrument of this invention includes as one embodiment a movable portion or well instrument T suspended on a cable C which provides means for translating the instrument T within a well bore, and also serves as a communications link with conventional equipment on the surface. The information relayed via the cable C is fed to a computer (FIGS. 9-11) having conventional components and programmed in accord with mathematical equations disclosed herein. The data is sensed by a plurality of translational sensors in a sensor unit L which is positioned on an inertial sensor platform 13 of the instrument T. The platform 13 is optionally stabilized in one degree of freedom by operation of a servo loop S for reasons more apparent hereinafter and the information from the sensor unit L is prepared for transmission through the cable C by signal conditioning means M. The indicating equipment at the surface processes the data to derive a three dimensional plot of the instrument T in the well bore.

Considering the invention more in detail, FIG. 2 discloses details of and an arrangement of parts of the invention which are preferably placed in the instrument T which serves as a protective shield and also provides adequate structure for the support of the components of the invention as it is lowered into a well. The instrument T is preferably formed of a tubular shell 10 equipped with a rope socket 10a at its upper end, and it may have a torpedo-like shape at 10b to facilitate entry into the well bore and penetration of any substances or fluids in the well bore. Provision for a ballast weight in a chamber 10c is provided at the lower end of the shell 10 to aid in adjusting the weight and center of mass of the instrument T. The sensor unit L is centrally located in the instrument T on a rigid mounting block 12 which rests on an inertial sensor platform 13 and the sensor unit L is secured to a shaft 14 extending through a hole 13a in the inertial sensor platform 13. The shaft 14 is rigidly connected to the sensor unit L so that rotation of the shaft 14 also rotates the sensor unit L. A gear 15 is mounted on the shaft 14 and meshes with an adjacent gear 16 for cooperative rotation therebetween to turn or rotate the sensor unit L as will be more evident hereinafter.

The gear 16 is mounted on a shaft 17 which is held in position at one end by a sleeve 13b placed in the inertial sensor platform 13 and the other end of the shaft 17 extends to a servomotor 18. The servomotor 18 is also connected to a control transformer 19, and it will be recognized by those skilled in the art that the components of the servo loop S cooperate together to rotate the shaft 17 in response to various signals.

A particular component of acceleration is sensed by the inertial sensors mounted in the sensor unit L and is conducted to the exterior of the sensor unit L by a plurality of commutators located generally at 20. A shaft 21 extends from the top of the sensor unit L and has groups of commutators mounted thereon at 21a, 21b, and 21c. Each of the commutator assemblies 21a, 21b, and 21c is contacted by brushes 22a, 22b, and 22c, respectively, so that the signals generated by the inertial sensors in the unit L may be commutated to wires and conductors which are connected to other portions of the invention.

The brush 22c is connected to a cable 23c which extends to an integrating amplifier 25 of the servo loop S which integrates a particular component of acceleration sensed within the sensor unit L to form a signal representative of velocity of the instrument T. The velocity of the instrument T is taken from the output of the integrating amplifier 25 by a conductor 26 and is connected to the control transformer 19 to provide a signal for operation of the servomotor 18. An anti-hunt circuit 27 is connected by a conductor 28 to the control transformer 19 to stabilize operation of the servo loop S which stabilizes the sensor unit L.

The unit L is stabilized by operation of the servo loop S when the instrument T is placed in a well bore and is lowered toward the bottom of the well bore, in which case the instrument T is susceptible of rotation about its major axis. This is done solely to reduce angular acceleration or velocity caused by rotation about the longitudinal axis but it is by no means necessary or required. Acceleration is sensed by the inertial sensors in the sensor unit L which form signals indicative thereof which are connected to the commutators at 21c and taken off by the brushes at 22c. The signals are then integrated by the integrating circuit 25 to derive velocity which drives the servomotor 18 to rotate the shaft 14 and the attached sensor unit L in the opposite direction. Rotation in the opposite direction of the unit L at the proper velocity stabilizes the sensors in the unit L with reference to rotation about the longitudinal axis of the instrument T. Stabilization of the sensors about the major axis of the instrument T greatly simplifies the computer used to calculate the course of the instrument T in the well from the accelerations sensed by the inertial sensors in the unit L.

The plurality of signals sensed by the brushes indicated at 22a, 22b is conducted or transferred to a plurality of adding circuits 29 for purposes which will be more evident hereinafter. To accomplish such transfer, a group of conductors, exemplified by the conduits 23a and 23b, is connected from the brushes 22a and 22b, respectively. The adding circuits represented generally at 29 are connected at their outputs to an analogue-to-digital converter 30 assuming analog sensors are used which converts the multitude of signals to digitized signals for ease of transmission to the computer portions of the system, assuring fidelity of the signals as they are transmitted through a long cable in the well in addition to providing a suitable interface with the computer subsystem. The digitized output signals are connected to cables 31, 33 and 34 which will be further defined hereinafter and which connect to amplifier assembly 32 which raises the level of the digitized signals to a level adequate for the transmission from the instrument T to the surface of the well.

The cables 31, 33 and 34 continue from the output of the amplifier assembly 32 and are connected into the cable C which is inserted into the rope socket 10a. Cables 31, 33 and 34 are encased in the cable C which is preferably of the woven or sleeve type having adequate strength to support the instrument T in the well bore while also providing protection for the electrical cables contained within the sleeve.

The sensor unit L includes accelerometers 41 through 52 shown schematically in FIG. 2A in the preferred form of the invention. The sensor unit L is shown in FIGS. 4–7 in its preferred structural form and includes a mounting plate 60, housings 61 and 62, and end plates 63 and 64. When the structural units are assembled and positioned on the inertial sensor platform 13, a face 60a of the plate 60 coincides with a plane such as the x–y plane to provide a mounting surface for the accelerometers lying in that plane as arranged in FIG. 2A. The accelerometers are mounted on the face 60a of the mounting plate 60 in the same order as shown in FIG. 2A so that all of the accelerometers are held in a well known and controlled position relative to one another. The accelerometer 42, for instance, is positioned in the center of the mounting plate 60a to measure acceleration of the sensor unit L along the y axis. The other accelerometers lying on the x–y plane are also positioned on the face 60a of the mounting plate 60 at accurately controlled distances and locations relative to the origin P of the x, y, z system. While it would be desirable to have the accelerometers 41, 42 and 43 positioned exactly at origin P, such is not physically possible, but they are located as close to the origin P as is physically possible (FIG. 2A) with the computer providing proper compensation. It is also physically impossible to position and maintain the nine additional accelerometers about the origin P at equal distances therefrom; however the sensor unit L positions the accelerometers at multiples of a unit measurement from the origin P so that mathematical operations performed in the computer associated with the invention are materially simplified. It is to be noted that any of the accelerometers which are shown positioned on one of the axes may be shifted 180° about the origin P to the complementary position without altering the acceleration sensed by that accelerometer in amplitude, if the output signal of the accelerometer is reversed in sign or polarity.

The sensor unit L is assembled around the mounting plate 60 by engaging the outer edge 60b of the plate 60 with a flanged lip 61a of a tubular member 61 which forms a protective shield around the accelerometers when the flanged lip 61a is engaged with the mounting plate 60. A similar tubular member 62 is positioned about the mounting plate 60 and abuts and adjoins the shell 61 which is better shown in FIG. 5. Each of the members 61 and 62 has a flange in the open end as exemplified by the flange 62a shown in FIG. 4. The flange 62a receives and engages the mounting plate 63 in an abutting position and carries the accelerometers 47 and 49 positioned on the y axis in FIG. 2A. The mounting plate 63 is centered by the tubular member 62 which secures and maintains the accelerometers 47 and 49 on the axis of the sensor unit L.

The open end of the member 61 is also flanged at 61b to receive a mounting plate 64 which completes fabrication of the sensor unit L. The mounting plate 64 carries the accelerometer 48 on its inner face 64a with the accelerometer 48 centered on the y axis of the housing H and having its sensitive axis extending along the z direction. The end plates may be permanently joined to the tubular housing by welding or other permanent means, but the entire assembly may be more serviceable if the tubular shells 61 and 62 are releasably secured to the plates 60, 63 and 64 by means such as bolts and nuts. Also serviceability may be further increased by providing hatches or doors wherever desirable.

FIGS. 5 and 6 show the relationship of the mounting plate 60 and the axes of the x, y, z coordinate system which is referenced to the sensor unit L. FIG. 5 illustrates the accelerometers positioned on the y axis on the plate 60 while FIG. 6 further illustrates that accelerometers positioned on the plate 60 are preferably grouped so that one group may be one unit or ρ distance away from the origin P while the other group is positioned twice the distance ρ from the origin P. In any event, the exact distance from the origin is pertinent only to the extent that the relative distances between the accelerometers and the origin is known for use in solution of the equations set forth heretofore.

FIG. 7 illustrates further details concerning the mounting and connection of accelerometers to the mounting plate 63. For instance, the mounting plate 63 is shown in FIG. 7 with the accelerometer 47 mounted on one side thereof and the accelerometer 49 mounted on the other surface. The accelerometer 47 is held on the plate 63 in a position corresponding to that illustrated in FIG. 2A by a U bolt 66 which is placed over the accelerometer 47 and secured to the plate 63 with bolts, rivets, or other attaching means at 67. The accelerometer 49 is received in a receptacle 68 which is secured to the plate 63 to position the accelerometer 49 on the z axis of the sensor unit L.

FIG. 3 is a modification of FIG. 7 which, as previously mentioned, illustrates means for mounting the Coriolis acceleration generator on a mounting plate 163 which corresponds with the plate 63 of FIGS. 4 and 7. The plate 163 is engaged with the flanged end 62a of the member 62 similar to the mounting provided for the plate 63. The motor 55 is located centrally on the plate 163, and the motor shaft 55a is extended through an opening 163a in the plate 163 to the interior of the member 62 where the shaft 55a is then connected to the crank shaft 54. The motor 55 is secured in place by attaching means such as bolts 69 or any other suitable means. Of course, the Coriolis acceleration generator can be positioned along the x or y axes and is not limited to the illustrated position. As previously mentioned, other Coriolis generators may be positioned in the sensor unit L, in which case the unit L would not be cylindrical for the full length thereof but would have mounting surfaces such as three intersecting cylinders for receiving and securing the driving motors 55 on the axes thereof. Also, the mounting plate 163 may be mounted in the central portion of the tubular sleeve 62 and the plate 63 mounted in the flange 62a as shown in FIG. 7 so that the sensor unit L includes the accelerometers shown in both FIGS. 3 and 7.

In operation, the instrument T is preferably suspended at the mouth of a well bore on the cable C and lowered into the well bore at a relatively steady speed. The instrument T traverses the well bore to the desired depth and is then stopped by manipulation of the cable C. The inertial sensors in the sensor unit L generate data for calculation of the course of the well which is transmitted by the cable C by the signal conditioning means M. Also, the servo loop S stabilizes the sensor unit L about its longitudinal axis to reduce one rotative parameter to approximately zero with a resultant simplification of the calculations. A similar technique, of course, can be utilized to stabilize partially or totally the other two degrees of freedom in the attitude of the sensor unit. The data obtained from lowering the instrument T into a well is preferably processed instantaneously on generation by the preferred computer configuration shown in FIG. 8. Of course, the data may be recorded by means known to those skilled in the art and fed to the computer at some later time.

Figure 8:
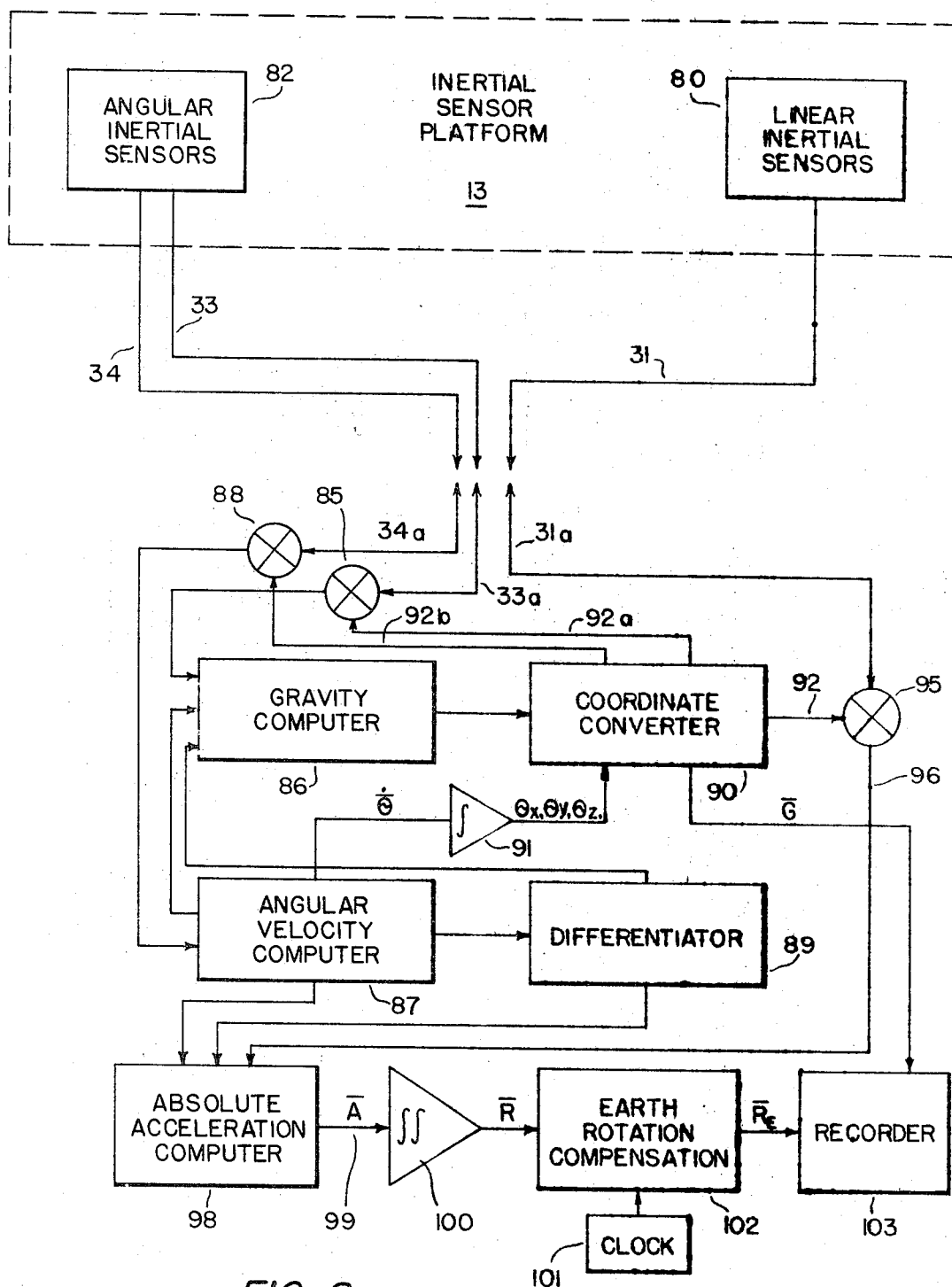
FIG. 8 is a schematic block diagram of a computer adapted for use with the signals output by the sensor unit.

A strapped-down or nonstabilized system for plotting the course of a well and for mapping the gravitational field strength in the well from the data supplied by the instrument T is illustrated schematically in FIG. 8. The inertial sensors of FIG. 2A arranged in a fixed spatial relationship relative to one another in the sensor unit L provide the information concerning the course of the instrument to the computer portion after conversion to digitized signal form, the preferred form for subsequent computation as defined by the equation previously developed. The signal output of each of the accelerometers 41, 42, and 43 is related to a component of the vectorial relative translational acceleration of the instrument T and they are logically grouped together so that the three accelerometers are classified as linear inertial sensors 80 in FIG. 8. The signal outputs of the linear inertial sensors 80 are conducted over the cable 31 from the unit L mounted on the inertial sensor platform 13 to other portions of the system.

As previously mentioned, the sensor unit L has up to nine additional stationary accelerometers arranged with their sensitive axes parallel to the sensitive axis of one of the linear inertial sensors 80 and positioned at known distances therefrom. The accelerometers 44 through 52, in conjunction with the linear inertial sensors 80, form a plurality of difference signals defined by navigational tensor and Equations 33a through 33i for use in solving for the gravitational gradient tensor $[\Delta g_{ij}]$ of Equation 4a and the rotational parameters $$\bar{\omega} \text{ and } \dot{\bar{\omega}}$$

Also, the preferred embodiment of the invention utilizes Coriolis acceleration generators positioned on the axes $x$, $y$, $z$ in conjunction with the stationary accelerometers to form additional difference signals defined by Equations 36a through 37c. The three generators are identical for ease of fabrication and each has the motor 55, the crank shaft 54, and the rotating inertial sensor 53 with each of the three inertial sensors distinguished by the numbers 53x, 53y, and 53z, thus denoting the axial position thereof. It should be pointed out that the described embodiment is illustrative of the present device and that any rotating angular inertial sensors will suffice.

Because the difference signals are used to calculate angular velocity $\bar{\omega}$ and its derivative $$\dot{\bar{\omega}}$$

and also to separate gravitational and nongravitational effects, the difference signals are grouped in FIG. 8 as the angular inertial sensors 82. The difference signals defined by the navigational tensor (33a–33i) and formed by the angular inertial sensors 82 are placed on conductors in the cables 33 and 34. The difference signals defined by rotating inertial sensing means such as Equations 36a through 37c are likewise input to conductors in cables 33 and 34 for communication with other elements of the system.

The difference or rotational signals from the cable 33 are connected to a cable 33a which connects to a gravity computer 86 after modification by an adder 85 for a purpose to be explained hereinafter. Also, the rotational terms from the cable 34 are connected to a cable 34a and fed to an angular velocity computer 87 after modification by an adder 88, the purpose of which will be fully explained. The angular velocity computer 87 generates $\bar{\omega}$ from the different signals input thereto in accord with the rotational equations of motion. That is to say, the angular velocity computer 87 is faced with the task of determining the components of angular velocity $\bar{\omega}$ of the inertial sensor platform 13, employing the angular velocity and angular acceleration data of the angular inertial sensors 82 while being subjected to both gravitational and nongravitational acceleration effects. The output $\bar{\omega}$ of the angular velocity computer 87 is conducted to a differentiating circuit 89 which takes the derivative of the input for use in other portions of the system, if it has not been determined otherwise.

With the difference signal inputs provided by the cable 33a, solution of the gravity gradient terms $[\Delta g_{ij}]$ is accomplished in the gravity computer 86 which then determines the gravitational field strength $\bar{g}(x,y,z)$ in the sensor unit.

The elapsed or total Euler angles $\theta_x$, $\theta_y$, $\theta_z$ rotated by the system are generated by inputting $$\bar{\omega} \text{ and } \dot{\bar{\theta}}$$

to the integrating circuit 91 which performs the indicated operation on Equations 24a, 24b, and 24c. The integrating circuit 91 supplies its output to a coordinate converter 90 which uses the elapsed or total angles of rotation $\theta_x$, $\theta_y$, $\theta_z$ to generate the trigonometric functions in Equation 19b. The coordinate converter 90 resolves the gravitational acceleration vector $\bar{g}$, or $g_x$, $g_y$, and $g_z$ in the axis system of the sensor unit, into $\bar{G}(X,Y,Z)$ of inertial space. The resolved components of the gravitational acceleration $\bar{g}$ are referenced to the moving coordinate system $x$, $y$, $z$ and such components are placed on an output conductor or cable 92. The cables 92a and 92b, respectively, supply inertially determined components of gravity to the adders 85 and 88 placed in the conductors or cables 33a and 34a, respectively. Addition of the resolved gravitational components to the difference signals provided by the angular inertial sensors 82 is performed in the adders 85 and 88. Such compensation for the gravitational effects on the masses of the accelerometers is theoretically necessary as has been previously explained.

The output signals of the linear inertial sensors 80 are conducted on the cable 31 to a mating cable 31a which extends to adders 95 in the system. As previously mentioned, the linear inertial sensors 80 provide components of relative translational acceleration of the housing H absent any compensation necessary to correct the signals because the accelerometers are insensitive to gravitational variations during free fall. The adders 95 add to each of the relative translational acceleration components the appropriate instantaneous value of the component of $\bar{g}$ conducted by the cable 92 to the adders 95, or alternatively they add incremental compensation components, depending upon the biasing scheme used. The output of the adders 95 is conducted by a cable 96 to an absolute acceleration computer 98.

The absolute acceleration computer 98 calculates the absolute vectorial acceleration of the instrument T in inertial space or acceleration measured with respect to the origin of the inertial coordinate system X,Y,Z. Equations 2a, 2b, and 2c when supplied with the components of the relative acceleration, the resolved components of $$\bar{\omega}$$

and the resolved components of $$\dot{\bar{\omega}}$$

The output of the absolute aceleration computer 98, $\bar{A}$, is conducted by a cable 99 to an integrating circuit 100 which twice integrates the absolution acceleration $\bar{A}$ to form an output signal $\bar{R}$ which is the instantaneous value of the range from the origin of the inertial reference system X,Y,Z to the instrument T.

While it is often of value to have the range of the instrument from the origin of the reference signal (the center of the earth), such information may be presented in a more meaningful form if it is referenced to the moving earth. Since the earth rotates at a near constant velocity to carry objects on the surface or interior thereof at a near constant velocity, the total distance of an object attributable to the rotation of the earth is a function of the time elapsed. Therefore, a clock 101 controls the time of operation of an earth rotation compensation circuit 102 which adds the components of the earth's rotation to the components of the range $\bar{R}$ to derive the range relative to the earth, denoted by the symbol $\bar{R}_E$. The outputs of the earth rotation compensation circuit 102, $\bar{R}_E$, and the output of the coordinate converter 90, $\bar{G}$, are recorded by a recorder 103 or other indicating equipment such as a data digitizer. Because an understanding of the gravitational gradient navigation technique is critical to this disclosure, an amplified view of the compensation for nonuniform spatial variations is presented in FIG. 9. Basically, it is a detailed schematic of the gravity computer 86 and the coordinate converter 90 in FIG. 8.

The angular inertial sensors 82 serve a number of functions, as has been demonstrated already, depending upon the particular kind of sensors that are used. In the simplest sense, they can be gyroscopic sensing means which determine only the incremental changes in navigational attitude; or, alternatively, they can become more sophisticated in that they constitute a general differential sensing array such as that of FIG. 2A. And lastly, there is a category in which they are rotating. In all of these respects, the first task of the angular inertial sensors 82 is to determine the rate of change of rotational state.

This function, however, is not fully realized by the state of the art of inertial sensing means. Such navigational sensors do not establish the changes in rotational state induced by spatial variations in nonuniform gravitational field phenomena. Consequently, the other important aspect of the angular sensors 82 plays a significant role. The differential inertial sensing means measure the navigational tensor of Equations 33a–33i which implicitly contains the gravitational gradient tensor $[\Delta g_{ij}]$ of Equation 4a. By means of mathematical computation techniques or more directly by rotating inertial sensors, separation of the gravitational gradient tensor from the navigational tensor can be realized, as presented theoretically in this disclosure. For these separated nonuniform gravitational field elements, the proper gravitational field strength is determined and used to compensate the navigational sensors.

Figure 9:
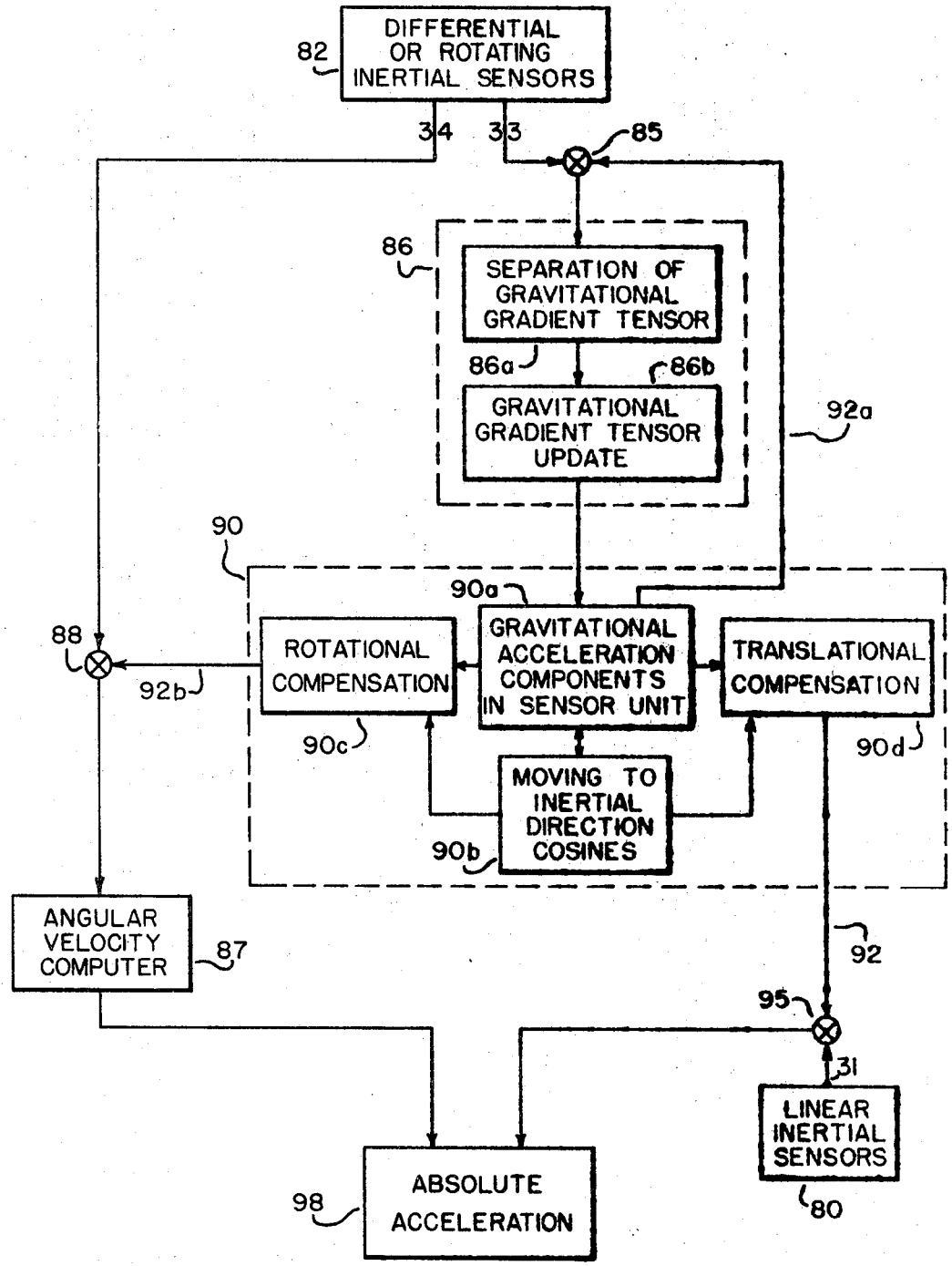
FIG. 9 is an amplified view of the gravity computer in FIG. 8 wherein the separation and determination of gravitational acceleration effects are accomplished.

In FIG. 9 the navigational tensor elements, as measured by differential or rotating angular inertial sensors 82, are conducted in cable 33 to adder 85. From adder 85 these difference or spatial variation signals are sent to gravity computer 86, where the separation of the gravitational gradient tensor 86a from nongravitational effects is accomplished. From the gravitational gradient tensor elements of certain previous states, then a tensor update 86b is performed using numerical techniques, producing the new value of gravitational field strength $\bar{g}(x,y,z)$ 90a in the sensor unit. Feedback within or around gravity computer 86 is provided by conductor 92a through adder 85 in order to assure previous states for the numerical integration technique employed.

Using the transpose of the navigational direction cosine matrix 90b of Equation 8, the gravitational field strength is transformed from moving sensor coordinates to the X,Y,Z inertial space as $\bar{G}(X,Y,Z)$. Optionally, the determination of gravitational field strength can be performed in inertial space to arrive at $\bar{G}(X,Y,Z)$, and this can then be transformed into the sensor unit for navigational compensation.

Having determined the proper value of gravitational field strength for motion in the presence of nonuniform gravitational variations, compensation of the inertial properties of the inertial sensing means is performed by coordinate converter 90.

Translational compensation 90d of FIG. 9 is concerned with correcting the linear inertial sensors 80 for nonuniform variations in gravitational field strength. In the preferred embodiment, the sensors 80 constitute a three-dimensional vector, which is continually compensated by the three-dimensional gravitational field vector produced by gravity computer 90 in $x,y,z$ navigational components.

Rotational compensation 90c of FIG. 9 is similar except that it is defined by a second rank tensor in its most general form. For any given gravitational field strength $\bar{g}(x,y,z)$ in navigational coordinates, the very structure of an inertial sensing array such as that of FIG. 2A constitutes a spatial navigational tensor. Each inertial sensor can have its own rotational compensation component. Otherwise, the rotating $\bar{g}$ vector, as it appears in the $x,y,z$ system, must be used to modulate the rotational compensation.

The translational compensation 90d is sent over conductor 92 to adder 95 where it is interfaced with conductor 31 bearing the data of linear inertial sensors 80. Likewise, the rotational compensation 90c is conducted over 92b to adder 88 where it is mixed with the difference signals 34 from differential angular inertial sensors 82.

From the gravitationally compensated rotational data 88, the angular velocity computer 87 determines the rotational parameters $$\bar{\omega} \text{ and } \dot{\bar{\omega}}$$

having eliminated the gravitational gradient tensor elements $[\Delta g_{ij}]$ from the navigational tensor of Equations 33a–33i. The rotational state parameters $$\bar{\omega} \text{ and } \dot{\bar{\omega}}$$

are then used to define the fundamental direction cosine transformation matrix of navigational Equations 8 and 32, using the rotational equations of motion 24a, 24b, 24c; 25a–25p; 26b; or 31a–31d.

Having determined the inertial behavior of the acceleration environment with translational inertial sensors 80 and rotational inertial sensors 82, and having then compensated the same for nonuniform variations in gravitational field phenomena, the absolute acceleration 98 is established for the navigational system in inertial space.

As an entity, FIG. 9 constitutes the crux of this disclosure. And because of its fundamental nature, one important characteristic of the figure must be noted: The property which makes it noninertial. Although the inertial sensors are themselves inertially biased, the compensation of FIG. 9 is a form of external bias. And although state of the art means are employed in sensors 80 and 82, the initial biasing can be accomplished in conjunction with the disclosure so as to deal only with the gravitational field strength $\bar{g}$, and not the incremental changes $[\bar{g}-\bar{g}_0]$ of Equation 15a. In this respect, the entity of FIG. 9 is a navigational sensing unit in itself.

Simplifications may be achieved in the system illustrated schematically in FIG. 8 by sacrificing sophistication. The sinusoidal torquing effects of the gravity gradient acting on the masses of the angular inertial sensors 82 are small; thus these oscillations can be neglected and consequently the adders 85 and 88 deleted. The clock 101 and the earth rotation compensation circuit 102 may be deleted without impairing the data recorded by the recorder 103. Furthermore, the integrator 100 may be omitted from the apparatus of this invention and the absolute acceleration computer 98 connected directly to the recorder 103 to form a three dimensional plot in acceleration space as the term is understood by those skilled in the terrestrial navigation art.

The embodiment of FIG. 8 may be adapted as a source providing positional information for guidance systems associated with space vehicles or other means for translating the instrument along a particular course, particularly in the presence of unmapped gravitational fields.

The cables 33 and 34 may be combined to reduce the number of difference signals supplied to the computer portion of system if the angular velocity computer 87 is capable of solving Equations 33a through 33i. The nine equations given are written in terms of nine unknowns with three of the unknowns repeated in derivative form. A solution of the nine equations by computer techniques may require that the computer 87 include means solving for the components of $$\bar{\omega}$$

and differentiating $$\bar{\omega} \text{ to form } \dot{\bar{\omega}}$$

Solution of the nine equations provides the gravity gradient for use in the gravity computer 86. If the components of $$\bar{\omega}$$

are supplied by solution of the simultaneous equations, then the Coriolis acceleration difference signals may be omitted from the angular inertial sensors 82 because the information supplied by them is generated within the angular velocity computer 87.

Figure 10A:
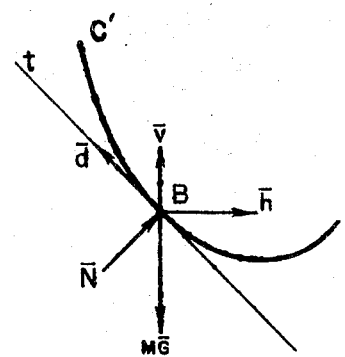
FIG. 10A is a free body diagram for illustrating the capability of dynamic gravitational well logging.
Figure 10:
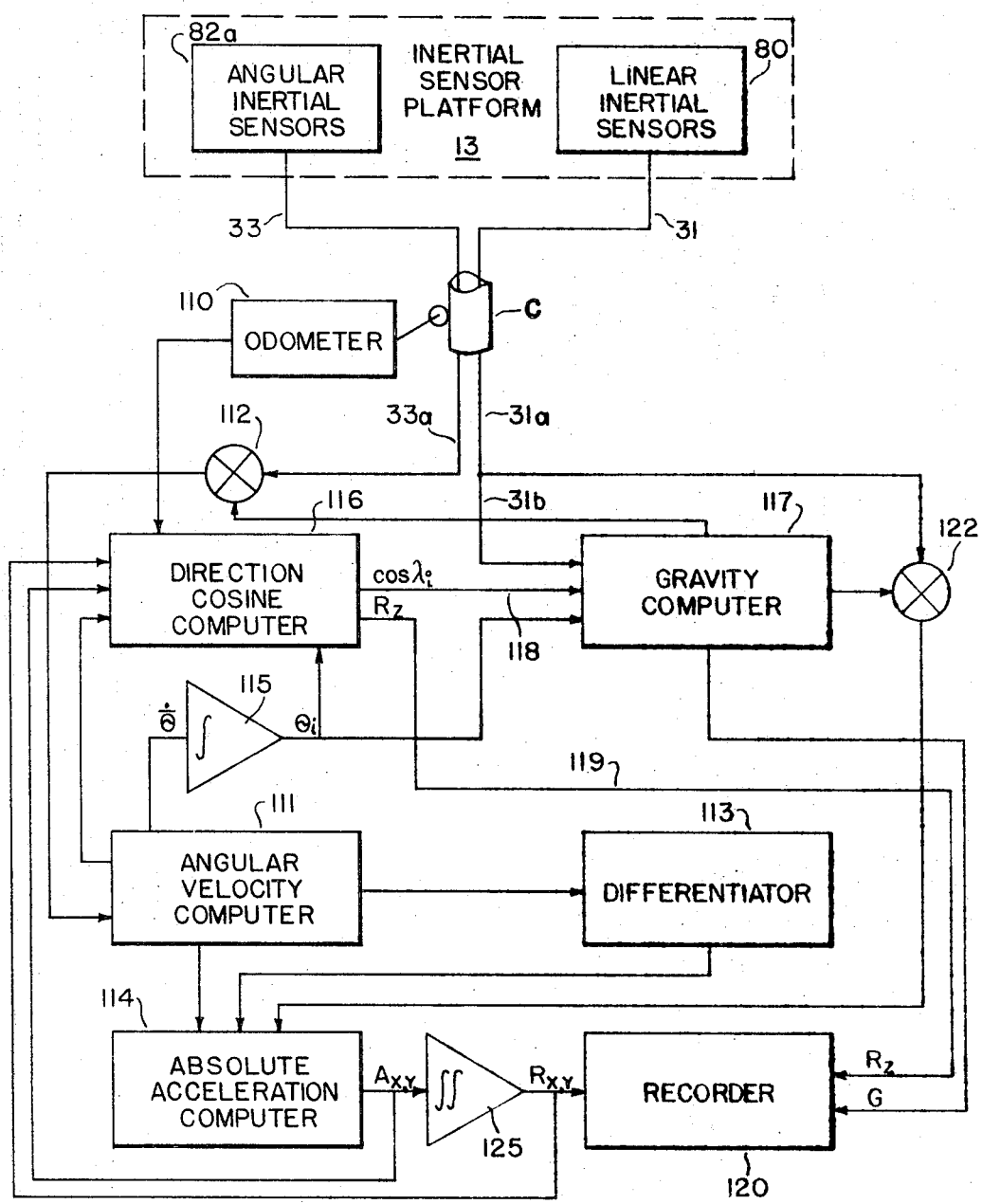
FIG. 10 is a schematic block diagram of an inertial surveying system utilizing the surveying-navigation instrument.

An alternative form of an inertial sensing system for calculating the course of a well and gravitational field strength in the well is shown in FIG. 10. A strapped-down system utilizing nine stationary accelerometers in the sensor unit L is placed on the inertial sensor platform 13 and the triad of accelerometers 41, 42, and 43, sensitive to translational relative acceleration, is grouped in the linear inertial sensors 80. The difference signals defined in Equations 33a through 33i are formed by the angular inertial sensors 82a. The angular inertial signals are obtained by proper subtraction of the signals from each of the accelerometers 44, 46, 47, 48, 51, and 52 from the outputs of the triad of accelerometers located at the origin of the moving coordinate system and are conducted by the cable 33 from the inertial sensor platform 13 to other elements of the system. Also, the linear inertial sensors 80 form the resolved components of the acceleration of the sensor unit L in the well and such signals are conducted by the cable 31 to other components of the system.

The instrument T is preferably lowered into a well by means of the attached wireline or cable C extending the length of the well to the surface for controlled ascent and descent to protect the equipment. As the sensors in the instrument T are lowered into the well, an odometer 110 or other similar measuring device measures the length of cable suspending the inertial sensor platform 13 in the well bore so that the total translation of the surveying instrument is measured.

The cable 33 extends through the well to the surface and connects to the mating cable 33a which supplies the angular rotational signals to an angular velocity computer 111. The difference signals in the cable 33a are modified to account for the sinusoidal oscillatory effects caused by the gravity gradient acting on the masses of the accelerometers, which is theoretically necessary although the magnitudes involved are so small as to be often insignificant. Addition of the undetected gravity gradient effects from the angular velocity terms is accomplished by the adder assembly 112. The angular velocity terms in cable 33a are manipulated in the angular velocity computer 111 to calculate the components of the angular velocity $$\bar{\omega}$$

which is supplied as an output signal to four circuits.

The angular velocity computer output signal is supplied to a differentiator 113 which forms a differentiated output signal. The differentiated output signal $$\dot{\bar{\omega}}$$

is conducted to an absolute acceleration computer 114 which also receives the angular velocity directly from the angular velocity computer 111. A third output of the angular velocity computer conducts the signal to an integrating circuit 115 which performs the indicated function to calculate elapsed or total rotational angles. The fourth output of the angular velocity computer 111 conducts the output signal to a direction cosine computer 116 for use therein.

The direction cosine computer 116 calculates the instantaneous value of $\cos \lambda_{ij}$ from five input signals as follows: The total distance translated by the inertial sensor unit L measured by the odometer 110; the range measured only in the X and Y dimensions, it being recalled that the X and Y axes can define a horizontal plane if treated in a mathematically proper fashion; the absolute acceleration sensed in the X and Y directions; the angular velocity determined by the angular velocity computer 111; and the total or elapsed angles of rotation of the system as generated by the integrating circuit 115. The cosine output signals of the direction cosine computer 116 are connected to a gravity computer 117 by a conductor 118. Also, the direction cosine computer 116 multiplies the length of cable measured by the odometer 110 by the instantaneous directional cosine value to calculate the translation of the sensors in the well along the Z axis, and this value is designated $R_Z$. The vertical range, $R_Z$, is conducted by a wire 119 to a recorder 120 to be recorded.

The cable 31 conducting the signals from the accelerometers 41, 42, and 43 is connected to the mating cable 31a which is connected to an adder assembly 122. The $A_z$ or vertical component of acceleration sensed in the well is taken from the cable 31a by a wire 31b as an input signal for the gravity computer 117. The absolute acceleration signal in the X and Y directions of the absolute acceleration computer 114 is also connected to the gravity computer 117 as an input signal. The components of the absolute acceleration and the relative acceleration in the z direction measured directly in the moving instrument provide adequate information to determine iteratively and dynamically the drag $\bar{d}$, the horizontal reactive force $\bar{h}$, and the gravitational force $m\bar{g}$ diagrammed in the free body diagram, FIG. 10A. The direction cosines conducted by the cable 118 supply adequate information to the gravity computer 117 to enable the gravity computer 115 to determine the instantaneous direction of the curve C' of FIG. 10A to permit solution for all forces involved in the free body diagram of FIG. 10A. The mass of the body experiencing the forces diagrammed in FIG. 10A is preferably measured beforehand to form a fixed parameter for the gravity computer 117.

The output of the gravity computer 117 is connected to the adders 112 and 122. The adder 112, as previously mentioned, modifies the angular inertial difference signals to compensate for the gravity gradient acting on the masses of the accelerometers and which cause rotation during descent and add sinusoidal oscillations to the difference signals. The adder 122 adds the resolved vectorial components of the gravity vector to the output signals of the accelerometers 41, 42, and 43 to form terms necessary for the solution of Equation 32. It is to be noted that the relative acceleration along the well bore is not necessary for the absolute acceleration computer 114 because calculations in the Z direction are carried out elsewhere.

The absolute acceleration computer 114 solves Equation 32 and forms an output signal of the absolute acceleration parallel to the X and Y axes of the reference coordinate system X,Y,Z. The absolute acceleration in the horizontal plane defined by the X and Y plane is twice integrated by an integrator circuit 125 to form an output signal $\bar{R}_{X,Y}$, which may be considered the horizontal deviation of the well from the vertical axis Z.

The recorder 120 records the horizontal deviation supplied by the integrator 125 and also records the total range in the Z direction output by the direction cosine computer 116. Also, the recorder 120 may record the value of the gravitational field intensity as calculated by the gravity computer 117.

The computer configuration of FIG. 10 may be simplified by altering the choice of accelerometers placed in the sensor unit L to include either one or two Coriolis acceleration generators which provide difference signals when referenced against the triad of accelerometers 41, 42, and 43 to yield the three components of the angular rotation as defined in Equations 36a to 37c. Solution of the components of $\omega$ reduces Equations 33a through 33i so that only three stationary accelerometers are needed to solve for the $(\Delta G_{ij})$ terms in the Equations 33a through 33i.

The use of two Coriolis acceleration generators in the angular inertial sensors 82a may eliminate all stationary accelerometers from the calculation of position of the instrument T with the exception of accelerometers 41, 42, and 43. Any two Coriolis acceleration generators positioned on two of the three axes of the unit L provide adequate information to solve for all three components of angular velocity in the system. Gravitational field strength is calculated as before, utilizing the gravity computer 117 which performs calculations intended to solve the free body diagram of FIG. 10A.

An additional embodiment of an inertial sensor system for determining the course of a well is schematically illustrated in FIG. 11. The inertial sensor platform 13 supports the sensor unit L and the accelerometers placed therein. The linear accelerometers 41, 42, and 43 are grouped in the linear inertial sensors 80 and the angular inertial sensors 82b define means determining rotational components of motion of the inertial sensor platform 13. The sensors 80 and the sensors 82b are connected to the cables 31 and 33, respectively, which extend to the computing portion of the system. The total translation of the inertial sensor platform 13 into the well is measured by the odometer 110 which measures the length of cable C extended into the well. The angular inertial sensors 82b preferably includes any two of the three Coriolis accelerometers 53x, 53y, or 53z for determination of the components of angular rotation as established in Equations 36a through 37c. The angular or rotational terms of motion of the inertial sensor platform 13 are fed to an angular velocity computer 180 which calculates the vectorial angular velocity of the sensing elements and forms an output signal in a cable 181. The output signal in the cable 181 is supplied to a circuit 182 which differentiates the signal to generate the acceleration of the sensing elements and such signal is connected to an output wire 183.

The signals in the cable 31, the acceleration sensed by the accelerometers 41, 42, and 43, are applied to an absolute acceleration computer 184 for solution of the translational equation of motion. Solution of this equation requires that the cable 181 and the wire 183 be connected to the absolute acceleration computer 184 as input conductors to supply angular velocity and acceleration of the system, $$\bar{\omega} \text{ and } \dot{\bar{\omega}}$$

The output of the odometer 110, being a measurement of the translation of the sensors into the well, is conducted by a wire 185 to a vertical displacement computer 186 which multiplies the length of cable by the instantaneous directional cosine of the angle existing between the Z axis and the instantaneous direction of the vertical axis of the sensor unit L to arrive at vertical displacement $R_Z$ of the tool in the well.

The output signal of the angular velocity computer 180 is connected by an additional conductor 187 to a circuit 188 which integrates the Euler rate $$\frac{\dot{\theta}}{\theta}$$

of Equation 24 to yield the elapsed or total Euler angles $\theta_x$, $\theta_y$, $\theta_z$ which are conducted by a cable 189 to other portions of the computer. The vertical displacement $R_Z$ of the tool in the well is applied to the absolute acceleration computer 184 for comparison in acceleration space with the data from the linear sensors 80 to eliminate erroneous gravitational effects from the readings derived therefrom.

A direction cosine computer 190 generates the instantaneous cosine of the angle existing between each of the moving axes x, y, z and the reference axes X, Y, Z. The directional cosine output is fed to the vertical displacement circuit 186, as previously mentioned, to obtain vertical displacement from the cable measurements supplied by the odometer 110. The horizontal acceleration generated by the acceleration computer 184 is conducted by a cable 193 to a circuit 194 which twice integrates the acceleration to generate $R_{X,Y}$ which represents the distance in the horizontal plane that the well deviates from the vertical. This information, and the vertical range, $R_Z$, is applied to a recorder 195 which forms a permanent record of such information which represents the course of the well and particularly shows the distance deviated by the well from the vertical.

In operation of the embodiments shown in FIGS. 10 and 11, the instrument T is suspended in the mouth of the well and then lowered into the well in much the same manner as previously stated. The instrument T is lowered to the desired depth and then retrieved from the well bore with the option of taking a second set of data on the return trip.

Potential uses for the invention exist in other applications subject to providing more applicable means for communications. As an example, radio communications linkage to the computer portion of the system and the subsequent increase in mobility resulting from replacement of the cable C will enable the sensor unit L to be translated with greater freedom in accordance with desires of the operator. Other alterations may be incorporated in the invention without departing from the scope of the disclosure and may enable use of the invention in applications other than oil well plotting. The instrument T may be varied in shape and content of equipment to any desired extent. Thus, if desired, the computer may be incorporated in the instrument T to eliminate some of the signal conditioning equipment. Further, the particular arrangement of sensing means (linear sensors, angular sensors, odometers) may be varied as exemplified by the variations incorporated in the embodiments of FIGS. 10 and 11. Those figures also disclose alternative computer arrangements which may be used in other applications of the invention.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A navigational device for relating a moving coordinate system to an arbitrary frame of reference in three-dimensional inertial space, comprising:
   inertial acceleration sensing means for determining all non-gravitational and uniform gravitational components of acceleration acting on said means in a moving coordinate system;
   differential inertial acceleration sensing means for sensing the spatial variations in non-gravitational and Newton and Non-Newtonian gravitational acceleration components;
   means for separating the non-gravitational acceleration components from the Newtonian and Non-Newtonian gravitational acceleration components sensed by said differential inertial acceleration sensing means;
   means for modifying the values of the uniform gravitational acceleration components of said inertial acceleration sensing means with the separated Newtonian and Non-Newtonian gravitational acceleration components to provide resultant non-uniform gravitational acceleration components;
   first computing means for relating a moving coordinate system to an arbitrary frame of reference from the resultant nonuniform gravitational acceleration components and nongravitational acceleration components from said inertial acceleration sensing means; and
   second computing means for determining position and velocity from the output of said first computing means.

2. The structure of claim 1, wherein the resultant nonuniform gravitational acceleration components are mapped as a function of position in order to indicate the magnitude of gravitational fields and gravitational mass anomalies.

3. A noninertial strapped-down acceleration sensor unit for sensing data to determine directly translational and angular accelerations due to both gravitational and nongravitational effects acting upon an object in uniform and nonuniform motion, comprising:
   a first strapped-down inertial sensing means for sensing translational acceleration of the sensor unit;

a second strapped-down inertial sensing means for sensing angular acceleration and angular velocity of the sensor unit;

a third strapped-down inertial sensing means for sensing Newtonian and non-Newtonian gravitational gradients acting on the sensor unit during uniform and nonuniform motion;

modifying means for modifying the acceleration effects sensed by the first and the second inertial sensing means with the third inertial sensing means to compensate for nonuniform gravitational acceleration effects; and an output means for indicating the resultant acceleration from said modifying means proportional to accelerations due to both gravitational and nongravitational effects acting upon the object in uniform and nonuniform motion.

4. The structure of claim 3, wherein at least one of the said inertial sensing means is rotated about an arbitrary axis.

5. A well surveying device having the structure of claim 3, including:
 (a) means for lowering said first, second, and third inertial sensing means into a well bore; and
 (b) means for twice integrating the data from said output means for providing an indication of the course of the well throughout the portion thereof traversed by said first, second, and third inertial sensing means.

6. The structure set forth in claim 5, including:
 means for indicating the sensed gravitational gradients of said third inertial sensing means along said indicated course of the well.

7. A noninertial strapped-down acceleration sensor unit for sensing data to determine directly translational and angular accelerations due to both uniform and nonuniform acceleration effects acting upon an object in motion, comprising:

a first strapped-down inertial sensing means for sensing uniform and nonuniform translational acceleration of the sensor unit;

a second strapped-down inertial sensing means for sensing uniform and nonuniform angular acceleration and angular velocity of the sensor unit;

a third strapped-down inertial sensing means for sensing nonuniform spatial variations in acceleration acting on the sensor unit;

modifying means for modifying the acceleration effects sensed by the first and the second inertial sensing means with the third inertial sensing means to compensate for nonuniform spatial variations in acceleration; and an output means for the resultant acceleration from said modifying means proportional to the actual uniform and nonuniform acceleration of the object in motion.

References Cited

UNITED STATES PATENTS

| | | | |
|---|---|---|---|
| 2,365,218 | 12/1944 | Rogers | 73—70 |
| 2,613,071 | 10/1952 | Hansel | 73—490 |
| 2,674,049 | 4/1954 | James | 73—151X |
| 2,695,165 | 11/1954 | Hansen | 73—517 |
| 2,895,670 | 7/1959 | Newell | 33—226 |
| 2,972,892 | 2/1961 | Tiffany | 74—5.37 |
| 3,035,479 | 5/1962 | Baltosser et al. | 73—382X |
| 3,087,333 | 4/1963 | Newell | 33—226X |
| 3,250,133 | 5/1966 | Savet | 73—382X |
| 3,090,240 | 5/1963 | Nashman et al. | 73—382 |
| 3,164,340 | 1/1965 | Slater et al. | |
| 3,180,151 | 4/1965 | Gustafsson | 73—382 |
| 3,194,948 | 7/1965 | Alexander et al. | 33—226Z |
| 3,214,575 | 10/1965 | Seliger et al. | 33—226Z |
| 3,250,133 | 5/1966 | Savet | 73—382X |
| 3,269,024 | 8/1966 | Fischer et al. | 73—226Z |
| 3,272,972 | 9/1966 | Yamron et al. | 73—266Z |

FOREIGN PATENTS 592,843  2/1960  Canada.

JAMES J. GILL, Primary Examiner

U.S. Cl. X.R.

73—178; 235—150.25

UNITED STATES PATENT OFFICE
CERTIFICATE OF CORRECTION

Patent No. 3,545,266   Dated December 8, 1970

Inventor(s) Thomas L. Wilson

It is certified that error appears in the above-identified patent and that said Letters Patent are hereby corrected as shown below:

In the Title, "Strapping" should be -- Strapped --.
Column 1, Line 58, "posterior" should be -- posteriori --.
Column 7, Line 20, "$\bar{\Phi}$-(R)" should be -- $\Phi(R)$ --.
Column 8, Line 64, The equation should be numbered (15).
Column 9, Line 29, "state" should be -- states --;

Column 13, Line 69, "$\dot{\theta}$" should be up in the sentence (line
Column 14, Line 50, In Eq. (29b): "$Pr$" should be -- $\bar{Pr}$ --.
Column 15, Line 9, "accout" should be -- account --; Line 15 "$\bar{\bar{R}}$" should be -- $\bar{\bar{R}}$ --; Line 18, In Eq. (30): "$R$" should be -- $\bar{R}$ -- and "$Pr$" should be -- $\bar{Pr}$ --.
Column 20, Line 29, Delete "where i,j,k".

Column 7, Line 60, Eq. (13): "$C_{mn}$" should be -- $C_{nm}$ --; "$\cos_m \gamma$" should be -- $\cos m\gamma$ --; and "$\sin_m \gamma$" should be -- $\sin m\gamma$ --.

Signed and sealed this 6th day of July 1971.

(SEAL)
Attest:

EDWARD M. FLETCHER, JR.
Attesting Officer

WILLIAM E. SCHUYLER,
Commissioner of Patent